(12) United States Patent
Yamada et al.

(10) Patent No.: US 10,930,154 B2
(45) Date of Patent: Feb. 23, 2021

(54) DRIVING SUPPORT SYSTEM, DRIVING SUPPORT APPARATUS, AND DRIVING SUPPORT METHOD

(71) Applicant: HONDA MOTOR CO., LTD., Tokyo (JP)

(72) Inventors: Hiroyuki Yamada, Wako (JP); Makoto Katayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 221 days.

(21) Appl. No.: 16/116,997

(22) Filed: Aug. 30, 2018

(65) Prior Publication Data

US 2019/0080611 A1 Mar. 14, 2019

(30) Foreign Application Priority Data

Sep. 8, 2017 (JP) .............................. JP2017-173031

(51) Int. Cl.
| | | |
|---|---|---|
| *G07C 5/00* | (2006.01) | |
| *G08G 1/09* | (2006.01) | |
| *G01S 19/00* | (2010.01) | |
| *B60W 30/12* | (2020.01) | |
| *B60W 30/188* | (2012.01) | |
| *B60W 30/095* | (2012.01) | |
| *B60W 30/08* | (2012.01) | |

(Continued)

(52) U.S. Cl.
CPC ......... *G08G 1/166* (2013.01); *G06K 9/00791* (2013.01); *G06K 9/00798* (2013.01); *G08G 1/012* (2013.01); *G08G 1/0112* (2013.01); *G08G 1/164* (2013.01); *H04W 4/023* (2013.01); *H04W 4/029* (2018.02); *H04W 4/40* (2018.02); *H04W 4/44* (2018.02)

(58) Field of Classification Search
None
See application file for complete search history.

(56) References Cited

U.S. PATENT DOCUMENTS

2016/0028824 A1* 1/2016 Stenneth .............. G08G 1/0112
709/219

FOREIGN PATENT DOCUMENTS

| CN | 103764472 | 4/2014 |
|---|---|---|
| CN | 105730443 | 7/2016 |

(Continued)

OTHER PUBLICATIONS

Machine translation of JP2006236247A.*

(Continued)

*Primary Examiner* — Adam D Tissot
(74) *Attorney, Agent, or Firm* — Amin, Turocy & Watson, LLP

(57) ABSTRACT

A driving support system includes a driving support apparatus that receives a information related to a predetermined spot, determines whether or not the predetermined spot is present ahead in a subject vehicle lane in which a subject vehicle is present based on this information, causes an in-car instrument to perform a predetermined operation based on a relative distance between an object present in an adjacent lane and the subject vehicle when the predetermined spot is not present ahead in the subject vehicle lane, and restrains the in-car instrument from performing the predetermined operation when the predetermined spot is present ahead in the subject vehicle lane.

8 Claims, 17 Drawing Sheets

(51) Int. Cl.
*G08G 1/16* (2006.01)
*G06K 9/00* (2006.01)
*G08G 1/01* (2006.01)
*H04W 4/40* (2018.01)
*H04W 4/029* (2018.01)
*H04W 4/02* (2018.01)
*H04W 4/44* (2018.01)

(56) References Cited

FOREIGN PATENT DOCUMENTS

| | | |
|---|---|---|
| JP | 08-002356 | 1/1996 |
| JP | 2002-104112 | 4/2002 |
| JP | 2006-236247 | 9/2006 |
| JP | 2006236247 A * | 9/2006 |
| JP | 2008-056136 | 3/2008 |
| JP | 2008056136 A * | 3/2008 |
| JP | 2008-282275 | 11/2008 |
| JP | 2012-221452 | 11/2012 |
| JP | 2013-242670 | 12/2013 |
| JP | 2014-119802 | 6/2014 |
| JP | 2015-203994 | 11/2015 |

OTHER PUBLICATIONS

Machine translation of JP2008056136A.*
Japanese Office Action for Japanese Patent Application No. 2017-173031 dated Jul. 2, 2019.
Chinese Office Action for Chinese Patent Application No. 201810991857.2 dated Nov. 30, 2020.

* cited by examiner

DRIVING SUPPORT SYSTEM, DRIVING SUPPORT APPARATUS, AND DRIVING SUPPORT METHOD

CROSS-REFERENCE TO RELATED APPLICATIONS

This application is based upon and claims the benefit of priority from Japanese Patent Application No. 2017-173031, filed Sep. 8, 2017, the entire content of which are incorporated herein by reference.

BACKGROUND

Field of the Invention

The present invention relates to a driving support system, a driving support apparatus, and a driving support method.

Description of Related Art

In the related art, a technology is known in which, when an obstacle is present off the road, it is determined that a region in which the obstacle is present is not a traveling lane, and detection of vehicles is stopped or an alarm or control exercised when detection of vehicles is restrained only for off the road where an obstacle is present (for example, refer to Japanese Unexamined Patent Application, First Publication No. 2013-242670).

In addition, a technology is known in which recognizing another vehicle approaching a subject vehicle from behind on a shoulder side of the road is stopped except for a two-wheeled vehicle, or recognizing an approaching vehicle is completely stopped (for example, refer to Japanese Unexamined Patent Application, First Publication No. 2002-104112).

In addition, a technology is known in which, when a linear trajectory of a traveling path of a subject vehicle is estimated from positional information of another vehicle specified through communication with the outside, it is determined that an object which is included in a traveling path area set based on the linear trajectory is a vehicle, and it is determined that an object which is not included in the traveling path area is a non-vehicle object (for example, refer to Japanese Unexamined Patent Application, First Publication No. 2012-221452).

SUMMARY

However, in the technologies in the related art, when an object is present off the road, an alarm is restrained from being output by an in-car instrument. Consequently, in the technologies in the related art, a way of controlling an in-car instrument when an object is present within a traveling lane has not been sufficiently examined.

Aspects of the present invention have been made in consideration of such circumstances, and an object thereof is to provide a driving support system, a driving support apparatus, and a driving support method, in which an in-car instrument can be controlled in a suitable mode when an object is present within a lane.

The driving support system, the driving support apparatus, and the driving support method according to the present invention employ the following configurations.

(1): According to an aspect of the present invention, a driving support system is provided, including a server apparatus that includes a server-side communication unit which communicates with one or more vehicles and acquires positional information from a specific vehicle of the one or more vehicles, a generation unit which generates a traveling trajectory of the specific vehicle based on the positional information acquired by the server-side communication unit, a determination unit which determines whether or not a predetermined spot is present in one or more lanes in which the specific vehicle has traveled, based on the traveling trajectory of the specific vehicle generated by the generation unit, and a communication control unit which causes the server-side communication unit to transmit information related to the predetermined spot to the one or more vehicles when the determination unit determines that the predetermined spot is present; and a driving support apparatus that includes a vehicle side communication unit which receives the information related to the predetermined spot from the server apparatus, a recognition unit which recognizes one or more objects present near a subject vehicle, and an instrument operation control unit which determines whether or not the predetermined spot is present ahead of the subject vehicle in a subject vehicle lane in which the subject vehicle is present based on the information received by the vehicle side communication unit, causes an in-car instrument to perform a predetermined operation based on a relative distance between an object, of the one or more objects recognized by the recognition unit, present in an adjacent lane adjacent to the subject vehicle lane and the subject vehicle when it is determined that the predetermined spot is not present ahead of the subject vehicle, and restrains the in-car instrument from performing the predetermined operation when it is determined that the predetermined spot is present ahead of the subject vehicle.

(2): In the driving support system according to the aspect (1), the determination unit may determine that the predetermined spot is present in the one or more lanes in which the specific vehicle has traveled, when the one or more lanes in which the specific vehicle has traveled include a first lane having a section in which the traveling trajectory is not present.

(3): In the driving support system according to the aspect (2), the determination unit may further determine that the predetermined spot is present in the one or more lanes in which the specific vehicle has traveled, when a plurality of traveling trajectories are present in a second lane adjacent to the first lane having the section in which the traveling trajectory is not present, in the one or more lanes in which the specific vehicle has traveled.

(4): In the driving support system according to the aspect (2) or (3), the determination unit may further determine that the predetermined spot is present in the one or more lanes in which the specific vehicle has traveled when the specific vehicle is decelerating at a time of acquiring the positional information.

(5): In the driving support system according to any one of the aspects (1) to (4), the in-car instrument may include an output unit which outputs information, and a steering control unit which controls a steering wheel. The instrument operation control unit may cause the output unit to output predetermined information as the predetermined operation when a first condition including that the relative distance is equal to or smaller than a threshold value or a time obtained by dividing the relative distance by a relative speed between an object present in an adjacent lane adjacent to the subject vehicle lane and the subject vehicle is equal to or smaller than a threshold value is satisfied, and may cause the steering control unit to control the steering wheel as the predetermined operation when a second condition including that a distance between a demarcation line demarcating the subject vehicle lane and the subject vehicle is equal to or smaller than a threshold value or a time obtained by dividing the distance between the demarcation line demarcating the subject vehicle lane and the subject vehicle by a speed of the subject vehicle in a vehicle width direction is equal to or smaller than a threshold value is satisfied.

(6): In the driving support system according to any one of the aspects (1) to (5), the server-side communication unit may further communicate with another external device and acquire traffic information indicating a traffic situation of a road from the external device. The determination unit may determine whether or not the predetermined spot is present in the one or more lanes in which the specific vehicle has traveled, based on the traveling trajectory of the specific vehicle generated by the generation unit and the traffic information acquired by the server-side communication unit.

(7): According to another aspect of the present invention, a driving support system is provided, including a server apparatus that includes a server-side communication unit which communicates with one or more vehicles and acquires positional information from a specific vehicle of the one or more vehicles, a generation unit which generates a traveling trajectory of the specific vehicle based on the positional information acquired by the server-side communication unit, and a communication control unit which causes information related to the traveling trajectory generated by the generation unit to be transmitted to the one or more vehicles; and a driving support apparatus that includes a vehicle side communication unit which receives the information related to the traveling trajectory from the server apparatus, a recognition unit which recognizes an object present near a subject vehicle, and an instrument operation control unit which determines whether or not a predetermined spot is present in one or more lanes in which the specific vehicle has traveled based on the information received by the vehicle side communication unit, causes an in-car instrument to perform a predetermined operation based on a relative distance between an object, of the one or more objects recognized by the recognition unit, present in an adjacent lane adjacent to a subject vehicle lane and the subject vehicle when a lane in which it is determined that the predetermined spot is present is not the subject vehicle lane in which the subject vehicle is present, and restrains the in-car instrument from performing the predetermined operation when the lane in which it is determined that the predetermined spot is present is the subject vehicle lane.

(8): According to another aspect of the present invention, a driving support apparatus is provided, including a vehicle side communication unit which receives information related to a predetermined spot specified in a lane in which another vehicle has traveled, based on a traveling trajectory of the different vehicle; a recognition unit which recognizes an object present near a subject vehicle; and an instrument operation control unit which determines whether or not the predetermined spot is present ahead of the subject vehicle in a subject vehicle lane in which the subject vehicle is present based on the information received by the vehicle side communication unit, causes an in-car instrument to perform a predetermined operation based on a relative distance between an object, of one or more objects recognized by the recognition unit, present in an adjacent lane adjacent to the subject vehicle lane and the subject vehicle when it is determined that the predetermined spot is not present ahead of the subject vehicle, and restrains the in-car instrument from performing the predetermined operation when it is determined that the predetermined spot is present ahead of the subject vehicle.

(9): According to another aspect of the present invention, a driving support method is provided, including causing a first computer to communicate with one or more vehicles and acquire positional information from a specific vehicle of the one or more vehicles, to generate a traveling trajectory of the specific vehicle based on the acquired positional information, to determine whether or not a predetermined spot is present in a lane in which the specific vehicle has traveled, based on the generated traveling trajectory of the specific vehicle, and to transmit information related to the predetermined spot to the one or more vehicles when it is determined that the predetermined spot is present in one or more lanes in which the specific vehicle has traveled; and causing a second computer mounted in the one or more vehicles to receive the information related to the predetermined spot from the first computer, to recognize an object present near a subject vehicle, to determine whether or not the predetermined spot is present ahead of the subject vehicle in a subject vehicle lane in which the subject vehicle is present, based on the received information, to cause an in-car instrument to perform a predetermined operation based on a relative distance between an object, of one or more of the recognized objects, present in an adjacent lane adjacent to the subject vehicle lane and the subject vehicle when it is determined that the predetermined spot is not present ahead of the subject vehicle, and to restrain the in-car instrument from performing the predetermined operation when it is determined that the predetermined spot is present ahead of the subject vehicle.

According to the aspects of (1) to (9), an in-car instrument can be controlled in a suitable mode when an object is present within a lane.

DESCRIPTION OF EMBODIMENTS

Hereinafter, a driving support system, a driving support apparatus, and a driving support method according to an embodiment of the present invention will be described with reference to the drawings.

Embodiment

[Overall Configuration]

Figure 1:
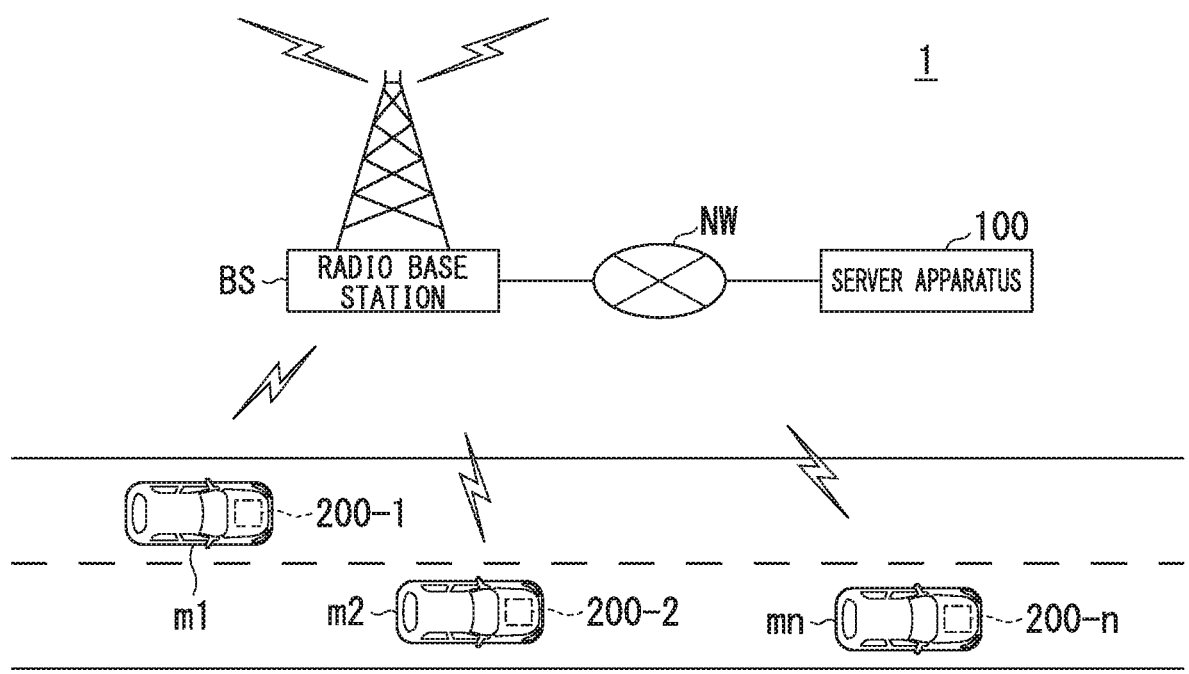
FIG. 1 is a view schematically illustrating an overall configuration of a driving support system according to an embodiment.

FIG. 1 is a view schematically illustrating an overall configuration of a driving support system 1 according to the embodiment. For example, the driving support system 1 includes a server apparatus 100 and vehicle control systems 200-1 to 200-*n* respectively mounted in vehicles. These apparatuses perform communication via a radio base station BS and a network NW. For example, radio communication utilizing a mobile phone network or the like is performed between each of the vehicle control systems 200-1 to 200-*n* and the radio base station BS. Cable communication utilizing the network NW, such as a wide area network (WAN), is performed between the radio base station BS and the server apparatus 100. Communication may be performed between each of the vehicle control systems 200-1 to 200-*n* and the server apparatus 100 by utilizing a road-side apparatus or the like installed at a road edge. Hereinafter, when the vehicle control systems 200-1 to 200-*n* are not particularly distinguished from one another, they will be simply abbreviated to a vehicle control system 200 in the description.

[Configuration of Server Apparatus]

Figure 2:
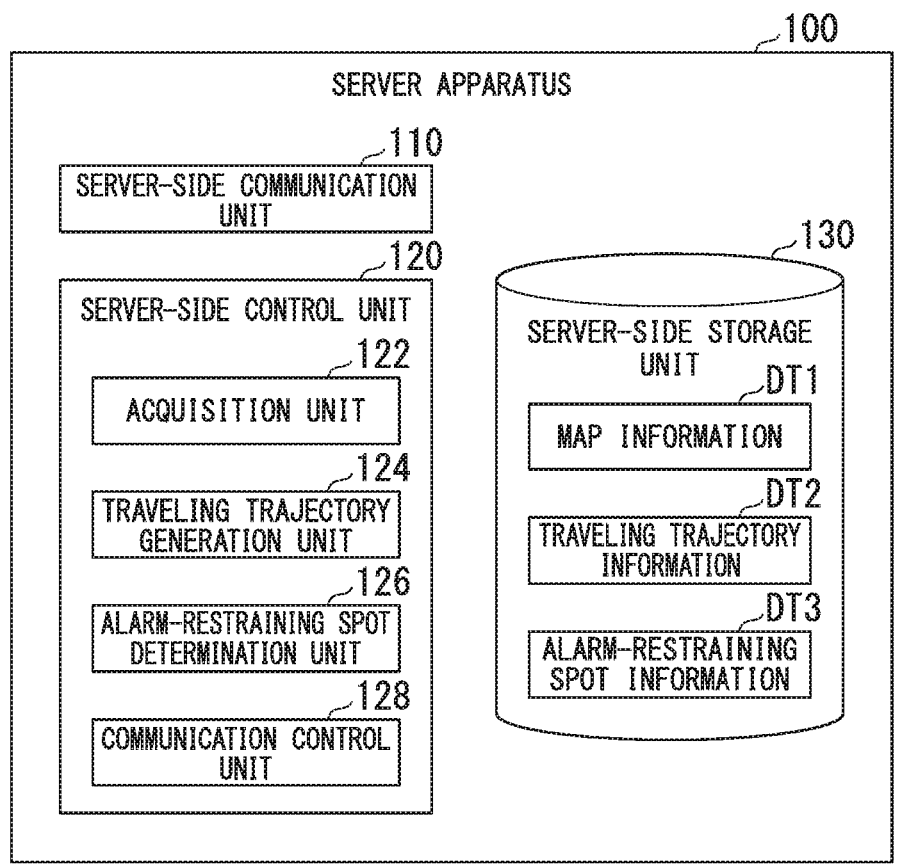
FIG. 2 is a view illustrating an example of a configuration of a server apparatus according to the embodiment.

Hereinafter, the server apparatus 100 will be described. FIG. 2 is a view illustrating an example of a configuration of the server apparatus 100 according to the embodiment. For example, the server apparatus 100 includes a server-side communication unit (server-side communicator) 110, a server-side control unit (server-side controller) 120, and a server-side storage 130.

The server-side communication unit 110 communicates with the vehicle control system 200 mounted in each of the vehicles or another external device via the radio base station BS and the network NW. For example, the external device is a server for providing users with information included in a system monitoring a traffic situation of the road, such as the vehicle information and communication system (VICS) (registered trademark). For example, the server for providing users with information collects information indicating the traffic situation of the road (which will hereinafter be referred to as traffic information), such as the traffic-jammed spots, the durations of the traffic jams, the occurrence of accidents, the presence or absence of a broken down vehicle, the presence or absence of a roadwork spot, the presence or absence of a fallen object, speed regulations, and lane restrictions.

For example, the server-side control unit 120 includes an acquisition unit (acquirer) 122, a traveling trajectory generation unit (traveling trajectory generator) 124, an alarm-restraining spot determination unit (alarm-restraining spot determiner) 126, and a communication control unit (communication controller) 128. For example, a part or all of these constituent elements are realized by a hardware processor, such as a central processing unit (CPU), executing a program (software). In addition, a part or all of these constituent elements may be realized by hardware (circuit unit; including circuitry), such as a large-scale integration (LSI), an application-specific integrated circuit (ASIC), a field-programmable gate array (FPGA), or a graphics-processing unit (GPU), or may be realized by software and hardware in a cooperative form. In addition, these constituent elements may be realized by one processor or may be realized by a plurality of processors.

For example, the server-side storage 130 is realized by a storage, such as a hard disc drive (HDD), a flash memory, an electrically erasable programmable read-only memory (EE-PROM), a read-only memory (ROM), or a random-access memory (RAM). The server-side storage 130 stores map information DT1, traveling trajectory information DT2, alarm-restraining spot information DT3, and the like, in addition to various programs, such as firmware and an application program.

For example, the map information DT1 is information expressing a link which indicates the road and the road shape which is formed by connecting nodes with the link. In addition, for example, the map information DT1 includes information of the center of a lane, information of the boundary of a lane, and the like. In addition, the map information DT1 includes information, such as a reference speed of the road, the number of lanes, the width of each lane, the gradient of the road, the position of the road (three-dimensional coordinates including the longitude, the latitude, and the height), the curvature of the road or the curve of each lane of the road, the positions of merging points and branching points of lanes, and signs provided on the road. For example, a reference speed is the legal limit of speed, or an average speed of a plurality of vehicles which have traveled along the road in the past.

The traveling trajectory information DT2 is information in which a traveling trajectory T generated by the traveling trajectory generation unit 124 is mapped on a map indicated by the map information DT1. Details of this information will be described below.

The alarm-restraining spot information DT3 is information in which an alarm-restraining spot is mapped on the map indicated by the map information DT1. An alarm-restraining spot is a spot at which driving support control of outputting the presence of a nearby vehicle to an occupant as an alarm is to be restrained. Details of this information will be described below. An alarm-restraining spot is an example of a "predetermined spot". In addition, the alarm-restraining spot information DT3 is an example of "information related to the predetermined spot".

[Processing Flow of Server Apparatus]

Figure 3:
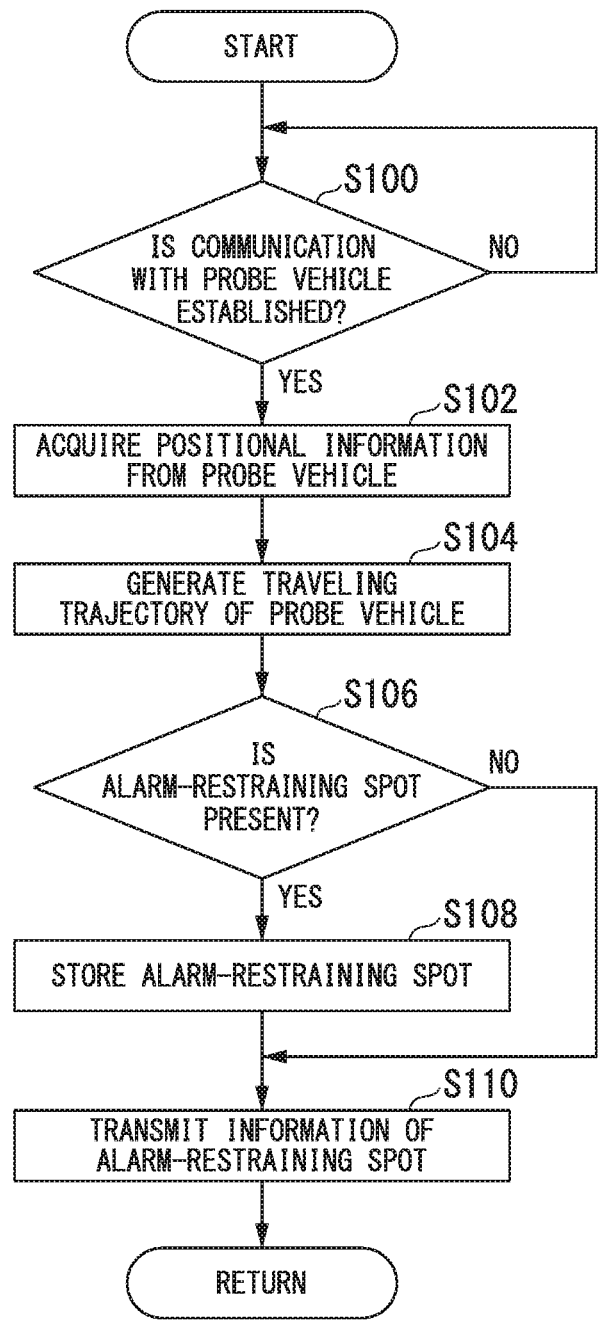
FIG. 3 is a flowchart illustrating a flow of a sequence of processing performed by a server-side control unit.

Hereinafter, processing of each of the constituent elements of the server-side control unit 120 will be described with reference to a flowchart. FIG. 3 is a flowchart illustrating a flow of a sequence of processing performed by the server-side control unit 120. Processing of this flowchart may be repetitively performed in a predetermined cycle.

First, the acquisition unit 122 stands by until the server-side communication unit 110 establishes communication with any specific vehicle (which will hereinafter be referred to as a probe vehicle) of one or more vehicles which can perform communication (Step S100). When communication is established, the acquisition unit 122 acquires positional information from the probe vehicle (Step S102). For example, the probe vehicle is a vehicle set in advance to transmit (upload) positional information to the server apparatus 100 at regular time intervals. The probe vehicle may be a vehicle in which the vehicle control system 200 is mounted or may be a vehicle in which the vehicle control system 200 is not mounted. For example, the positional information is information such as the coordinates indicating a position of the probe vehicle in a lane in which the probe vehicle travels. For example, such positional information may be obtained by utilizing a satellite positioning system such as a global positioning system (GPS). For example, an artificial satellite for a satellite positioning system may include a quasi-zenith satellite. The probe vehicle is an example of a "specific vehicle".

When the server-side communication unit 110 communicates with a server for providing users with information, the acquisition unit 122 may acquire traffic information from this server for providing users with information.

Next, the traveling trajectory generation unit 124 generates the traveling trajectory T of the probe vehicle based on the positional information of the probe vehicle acquired by the acquisition unit 122, and the map information DT1 (Step S104). For example, based on the positional information, the traveling trajectory generation unit 124 derives presence probability F of the probe vehicle in a vehicle width direction (which will hereinafter be referred to as a Y-direction) of the road in which the probe vehicle has traveled. The traveling trajectory generation unit 124 causes a position, at which the presence probability F becomes equal to or greater than a threshold value Th, to be mapped on the map indicated by the map information DT1. Then, the traveling trajectory generation unit 124 generates the traveling trajectory T by joining the mapped positions in a forward moving direction (which will hereinafter be referred to as an X-direction) of the vehicle. The traveling trajectory generation unit 124 associates the traveling trajectory T mapped on the map indicated by the map information DT1 with a travel time of the probe vehicle or an acquired time of the positional information, and this associated information is stored as the traveling trajectory information DT2 in the server-side storage 130.

Figure 4:
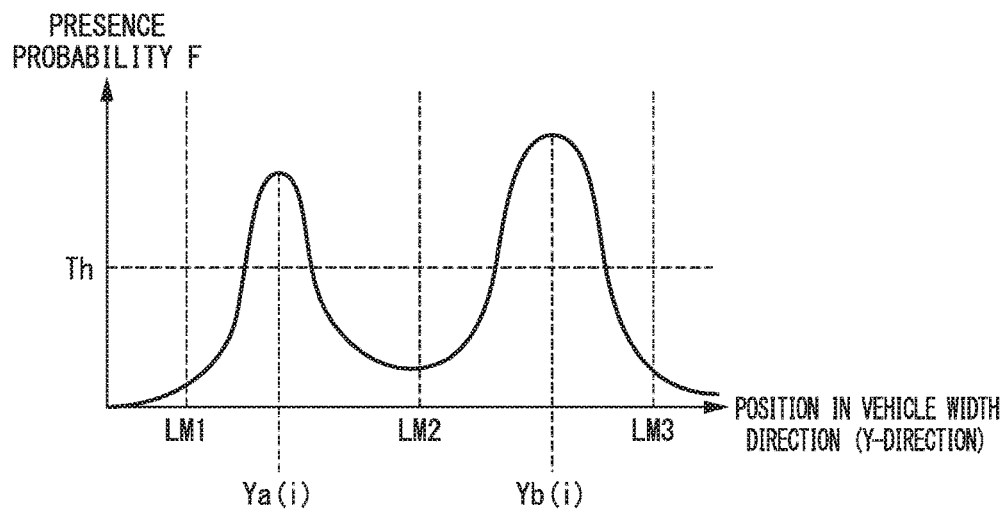
FIG. 4 is a view illustrating an example of presence probability of a probe vehicle in a vehicle width direction.

FIG. 4 is a view illustrating an example of the presence probability F of the probe vehicle in the vehicle width direction. In the diagram, the vertical axis indicates the presence probability F of the probe vehicle, and the horizontal axis indicates the position coordinates in the vehicle width direction (Y-direction). The reference signs LM1, LM2, and LM3 indicate demarcation lines demarcating a lane. For example, the traveling trajectory generation unit 124 derives the ratio obtained by dividing the number of times of appearance of the position of the probe vehicle in the vehicle width direction in a predetermined section in the forward moving direction of the vehicle by the total number of positions which appear in the section, as the presence probability F of the probe vehicle at the position. More specifically, when the total number of positions which appear in the predetermined section is 100, and when ten thereof indicate a certain position A, the presence probability F at the position A is derived as $\frac{1}{10}$ or a value based on this value (for example, $\frac{1}{10} \times$arbitrary coefficient $\alpha$). In the illustrated example, in a lane L1 demarcated with the demarcation lines LM1 and LM2, a position Ya(i) of the presence probability F exceeding the threshold value Th and marking the peak becomes one node point N of the traveling trajectory T in the lane L1 at a certain sampling position X(i). The reference sign I indicates an arbitrary sampling time. The sampling position X(i) is a certain position (for example, a middle point in the forward moving direction of the vehicle) of a plurality of positions continuously present in the forward moving direction of the vehicle in the above predetermined section. Similarly, in a lane L2 demarcated with the demarcation lines LM2 and LM3, a position Yb(i) of the presence probability F exceeding the threshold value Th and marking the peak becomes one node point N of the traveling trajectory T in the lane L2 at the sampling position X(i). The traveling trajectory generation unit 124 generates the traveling trajectory T by connecting the node points N with a line for each lane.

Figure 5:
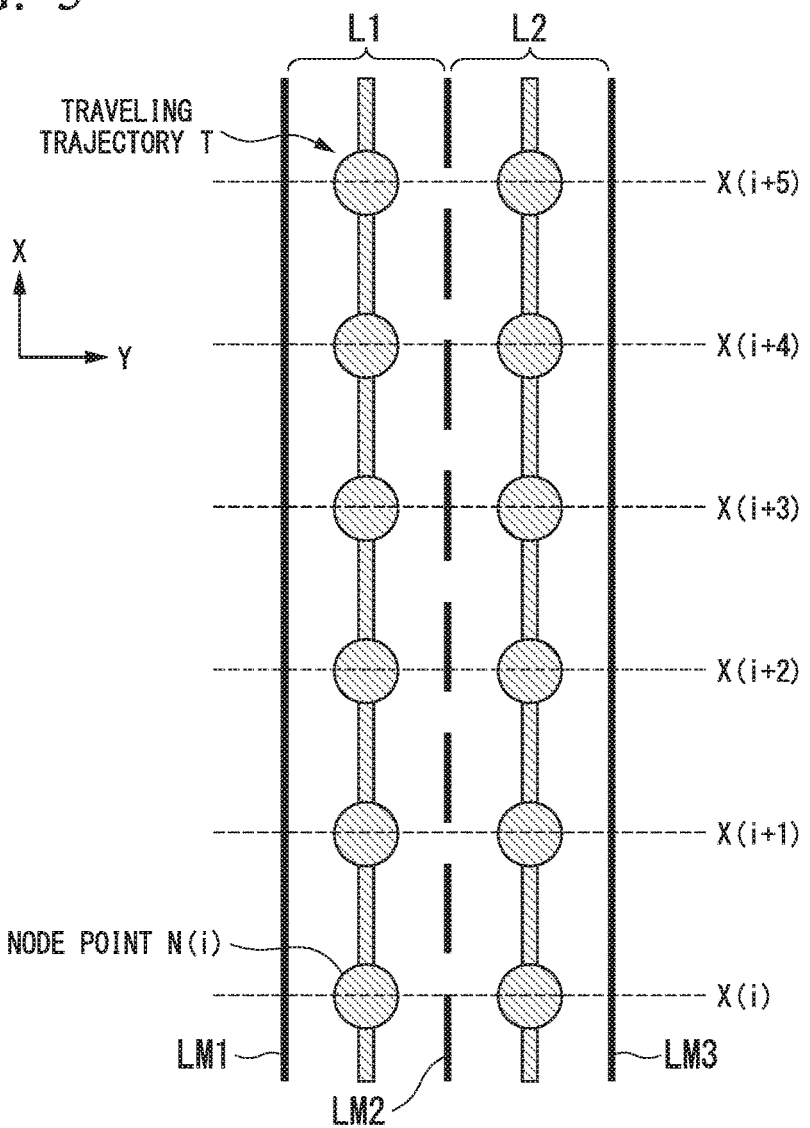
FIG. 5 is a view illustrating an example of traveling trajectory information.

FIG. 5 is a view illustrating an example of the traveling trajectory information DT2. As in the illustrated example, the traveling trajectory information DT2 is information indicating a traveling trajectory plotted on a map in which the positions, the number, the widths, and the like of demarcation lines are set in advance. In the illustrated example, in each of the sampling positions X(i) to X(i+5), since the node points N appear within the lane L1 demarcated with the demarcation lines LM1 and LM2 and within the lane L2 demarcated with the demarcation lines LM2 and LM3, one traveling trajectory T is generated in each lane.

In the example described above, one traveling trajectory T has been described to be generated in each lane. However, the configuration is not limited thereto, and a plurality of traveling trajectories T may be generated in one lane.

Figure 6:
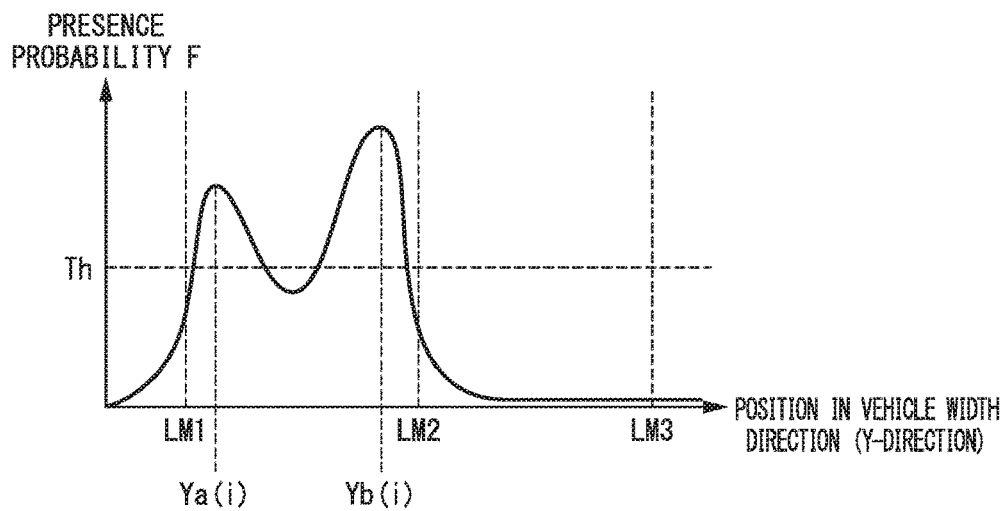
FIG. 6 is a view illustrating another example of the presence probability of a probe vehicle in the vehicle width direction.

FIG. 6 is a view illustrating another example of the presence probability F of the probe vehicle in the vehicle width direction. In the illustrated example, at a certain sampling position X(i+1) in the forward moving direction of the vehicle in the lane L1 demarcated with the demarcation lines LM1 and LM2, the presence probability F exceeding the threshold value Th and marking the peak is indicated at a position Yc(i) and a position Yd(i). In such a case, the traveling trajectory generation unit 124 generates two traveling trajectories T within the lane L1.

Figure 7:
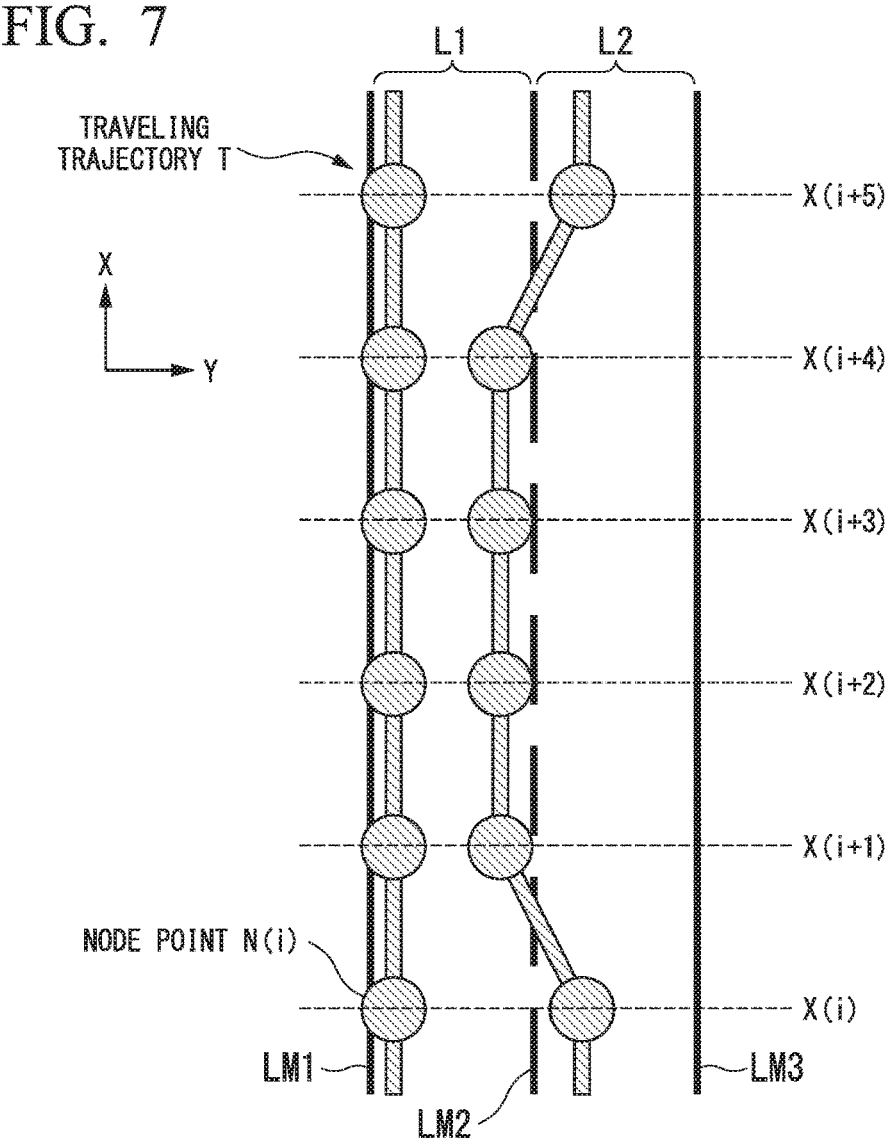
FIG. 7 is a view illustrating another example of the traveling trajectory information.

FIG. 7 is a view illustrating another example of the traveling trajectory information DT2. The route illustrated in the example of FIG. 7 indicates the same route as the route illustrated in the example of FIG. 5. The travel time of the probe vehicle varies in the traveling trajectories T illustrated in the examples of the diagrams. In the example of FIG. 7, the node points N appear at the sampling positions X(i) and X(i+5) within the lane L1 demarcated with the demarcation lines LM1 and LM2 and within the lane L2 demarcated with the demarcation lines LM2 and LM3, and two node points N appear at each of the sampling positions X(i+1) to X(i+4) within the lane L1 demarcated with the demarcation lines LM1 and LM2. In such a case, the traveling trajectory generation unit 124 generates a traveling trajectory T which stays within one lane at all times, and another traveling trajectory T which crosses into another lane in a section of the sampling positions X(i+1) to X(i+4) and stays within its original lane in another section.

Next, the alarm-restraining spot determination unit 126 determines whether or not an alarm-restraining spot is present in a route in which the traveling trajectory T indicated by the traveling trajectory information DT2 is mapped, based on the traveling trajectory information DT2 (Step S106).

For example, the alarm-restraining spot determination unit 126 determines that an alarm-restraining spot is not present in the route when one traveling trajectory T of the probe vehicle is present at all times in each lane of the route in which the traveling trajectory T indicated by the traveling trajectory information DT2 is mapped (refer to FIG. 5).

The alarm-restraining spot determination unit 126 determines that an alarm-restraining spot is present in the lane when a lane of one or a plurality of lanes of the route in which the traveling trajectory T indicated by the traveling trajectory information DT2 is mapped, having a section in which a part of the traveling trajectory T of the probe vehicle is not present, is present (refer to FIG. 7). In the example of FIG. 7 described above, it is determined that the section of the sampling positions X(i+1) to X(i+4) in which the traveling trajectory T of the probe vehicle crosses into a different lane is an alarm-restraining spot. For example, such a traveling trajectory T is generated when an obstacle OB (for example, a roadwork site) is present ahead and the probe vehicle performs a lane change to the lane L1 (adjacent lane) to avoid the obstacle OB, while the probe vehicle is traveling in the lane L2. Therefore, when a communication target vehicle (a vehicle in which the vehicle control system 200 is mounted) is traveling in the same route as a route in which the probe vehicle has traveled and in the same time zone as a time zone in which the probe vehicle has traveled, there is high probability that the obstacle OB is present in the lane, and it is postulated that the communication target vehicle also performs a lane change to an adjacent lane, similar to the probe vehicle. In addition, in a certain target lane, when the traveling trajectory T of the probe vehicle is not present at a certain first time (for example, a time closest to the current time), and when the traveling trajectory T of the probe vehicle is present at another time, that is, a second time (for example, several days ago), for example, it is regarded that the probe vehicle has moved in the target lane at the second time and has not moved therein at the first time. Therefore, it is determined that an alarm-restraining spot has been present at the first time (there is a higher probability that the obstacle OB has been present at the first time than the second time) even in the same lane. In such a case, when performing a lane change to the original lane after passing by the obstacle OB in an adjacent lane, the obstacle OB is positioned behind in the adjacent lane. Therefore, a driving support apparatus 300 of the vehicle control system 200 described below may output an alarm for a notification of the presence thereof.

In contrast, in the present embodiment, a certain spot having a possibility of passing by such an obstacle OB in an adjacent lane is estimated from a pattern of the traveling trajectory T of the probe vehicle, so that the spot is recognized as an alarm-restraining spot, and an output of an alarm is restrained until a vehicle passes through the spot. Therefore, an alarm can be restrained from being output at a position where the obstacle OB, which the vehicle has passed by in an adjacent lane, is located behind the communication target vehicle.

In addition, in the present embodiment, an output of an alarm is restrained until the vehicle passes through an alarm-restraining spot. Therefore, even when another vehicle is present behind a subject vehicle M (behind the obstacle OB) after a lane change is performed before an alarm-restraining spot, an alarm can be restrained from being output due to the presence of another vehicle. For example, when another vehicle is traveling immediately after the subject vehicle M before the subject vehicle M performs a lane change to an adjacent lane before an alarm-restraining spot, the different vehicle is positioned behind when seen from the subject vehicle M, after the subject vehicle M performs a lane change to the adjacent lane. In this case, the different vehicle becomes a target of an output of an alarm. However, since the subject vehicle M has passed through the alarm-restraining spot, an output of an alarm for the presence of another vehicle is restrained.

In addition, the alarm-restraining spot determination unit 126 may determine that an alarm-restraining spot is present in a lane (lane L2 in the example of FIG. 7) adjacent to a lane in which a plurality of traveling trajectories T are present, when a lane (lane L1 in the example of FIG. 7), of the lanes of the route in which the traveling trajectory T indicated by the traveling trajectory information DT2 is mapped, having a section, in which a plurality of traveling trajectories T of the probe vehicle are present, is present.

In addition, the alarm-restraining spot determination unit 126 may further determine whether or not an alarm-restraining spot is present in the route in which the traveling trajectory T indicated by the traveling trajectory information DT2 is mapped, based on the interval between the node points N included in the traveling trajectory T of the probe vehicle, in addition to the pattern of the traveling trajectory T of the probe vehicle.

Figure 8:
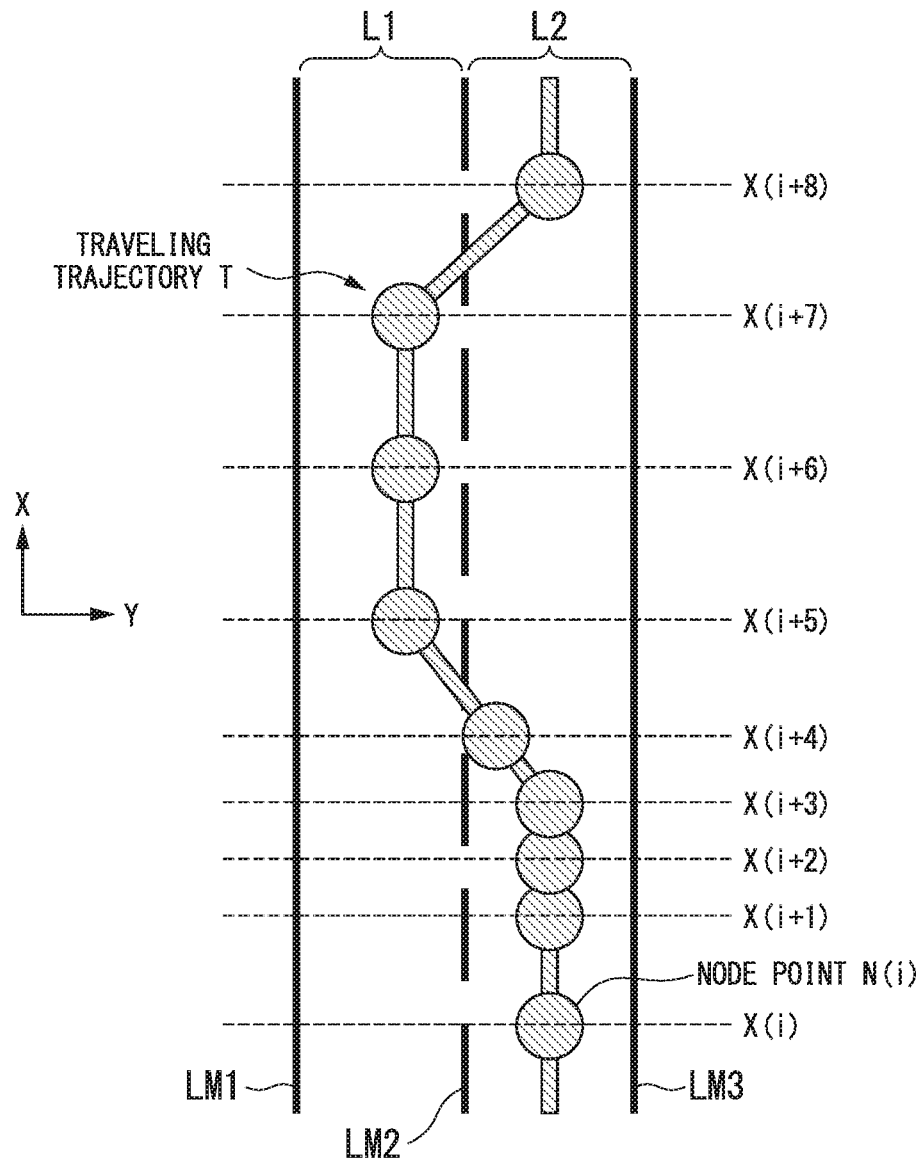
FIG. 8 is a view for describing a method of determining the presence or absence of an alarm-restraining spot based on an interval between node points.

FIG. 8 is a view for describing a method of determining the presence or absence of an alarm-restraining spot based on the interval between the node points N. In the illustrated example, the intervals between the node points N at the sampling positions X(i+1) to X(i+4) are narrower than the interval between the node points N in another section. Such a traveling trajectory T is generated when the probe vehicle decelerates in the section of the sampling positions X(i+1) to X(i+4) in the lane L2, performs a lane change to the lane L1 while accelerating, and performs a lane change to the original lane L2 at the timing of being at the sampling position X(i+7). For example, it is possible to determine that a situation in which the probe vehicle performs a lane change after reducing the speed has occurred because it was necessary for the probe vehicle to unavoidably decelerate. Therefore, compared to a situation of performing a lane change without reducing the speed, it is possible to determine that there is a higher probability of the presence of the obstacle OB. Therefore, the alarm-restraining spot determination unit 126 may further determine that an alarm-restraining spot is present on condition that a section having a narrower interval between the node points N than another section is present in the traveling trajectory T mapped in a lane having a section in which a part of the traveling trajectory T of the probe vehicle is not present, in addition to the route in which the traveling trajectory T indicated by the traveling trajectory information DT2 is mapped having a section in which a part of the traveling trajectory T of the probe vehicle is not present.

In addition, in the example described above, it is determined whether or not an alarm-restraining spot is present in the lane, based on the interval between the node points N of the traveling trajectory T mapped in a lane having a section in which a part of the traveling trajectory T is not present. However, the configuration is not limited thereto. For example, the alarm-restraining spot determination unit 126 may determine whether or not an alarm-restraining spot is present in a lane having a section in which a part of the traveling trajectory T is not present based on the interval between the node points N of the traveling trajectory T mapped in an adjacent lane adjacent to a lane having a section in which a part of the traveling trajectory T is not present. For example, when a plurality of traveling trajectories T are present in an adjacent lane, and when at least one of the traveling trajectories T has a narrow interval between the node points N, it can be regarded that the probe vehicle which has plotted the one traveling trajectory T has decelerated due to another probe vehicle which has plotted another traveling trajectory T and has crossed into the lane. Therefore, the alarm-restraining spot determination unit 126 may further determine that an alarm-restraining spot is present in a lane having a section in which a part of the traveling trajectory T is not present on condition that a section having a narrower interval between the node points N than another section is present in the traveling trajectory T of an adjacent lane, in addition to that, a plurality of traveling trajectories T of the probe vehicle are present in an adjacent lane.

In addition, when traffic information is acquired by the acquisition unit 122, the alarm-restraining spot determination unit 126 may determine whether or not an alarm-restraining spot is present within a predetermined distance ahead in a lane in which the communication target vehicle is present, in consideration of both various pieces of information, such as occurrence of accidents, the presence of a broken down vehicles, the presence or absence of a roadwork spot, and the presence or absence of a fallen object, included in this traffic information; and the traveling trajectory T of the probe vehicle.

When it is determined that an alarm-restraining spot is present, the alarm-restraining spot determination unit 126 associates information in which a position or a section determined as an alarm-restraining spot is mapped on the map indicated by the map information DT1 with a time which has been associated with the traveling trajectory information DT2 and used as a reference at the time of determination processing. Then, this information is stored in the server-side storage 130 as the alarm-restraining spot information DT3.

Next, the communication control unit 128 controls the server-side communication unit 110 to transmit the alarm-restraining spot information DT3 stored in the server-side storage 130 to the communication target vehicle (Step S108).

For example, the communication control unit 128 preferentially transmits the alarm-restraining spot information DT3, which has been associated with a time close to the current time, of the alarm-restraining spot information DT3 stored in the server-side storage 130, to the communication target vehicle. In this manner, the processing of this flowchart ends.

[Configuration of Vehicle Control System]

Hereinafter, the vehicle control system 200 will be described. A vehicle in which the vehicle control system 200 is mounted (which will hereinafter be referred to as a subject vehicle M) is a vehicle with two wheels, three wheels, or four wheels, for example, and its driving source is an internal-combustion engine such as a diesel engine or a gasoline engine, an electric motor, or a combination thereof. The electric motor operates while using electric power generated by an electric generator interlocked to an internal-combustion engine, or electric power discharged by a secondary battery or a fuel cell.

Figure 9:
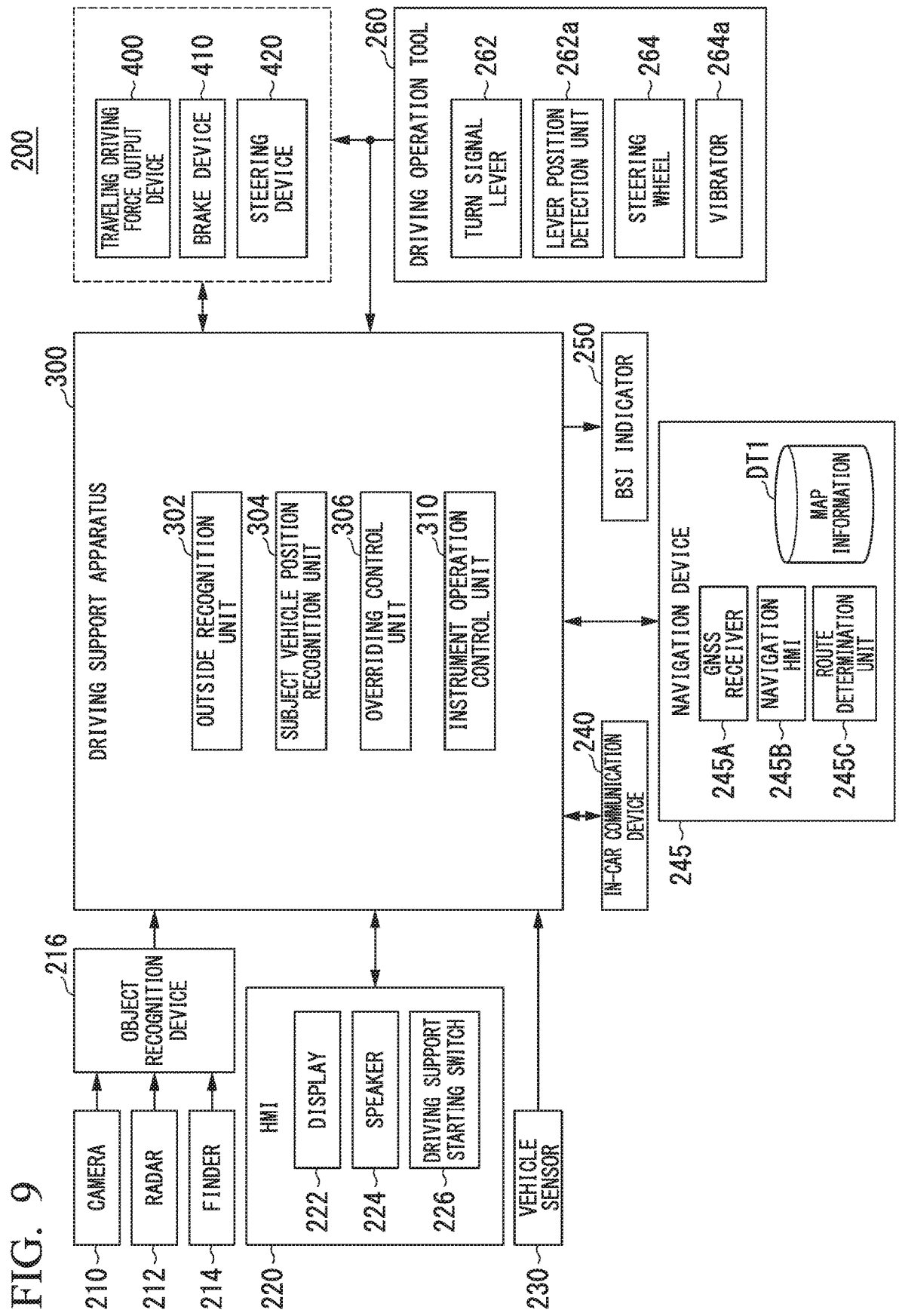
FIG. 9 is a view illustrating an example of a configuration of a vehicle control system according to the embodiment.

FIG. 9 is a view illustrating an example of a configuration of the vehicle control system 200 according to the embodiment. For example, the vehicle control system 200 includes a camera 210, a radar 212, a finder 214, an object recognition device 216, a human machine interface (HMI) 220, a vehicle sensor 230, an in-car communication device 240, a navigation device 245, a blind spot information (BSI) indicator 250, a driving operation tool 260, the driving support apparatus 300, a traveling driving force output device 400, a brake device 410, and a steering device 420. These devices and instruments are connected to one another through a multiplex communication line such as a controller area network (CAN) communication line, a serial communication line, a radio communication network, or the like. The configuration illustrated in FIG. 9 is merely an example. A part of the configuration may be omitted, or another configuration may be added thereto. The configuration of the driving support apparatus 300 may include other configurations in addition to the apparatus itself, such as the object recognition device 216, the in-car communication device 240, the driving operation tool 260, and the BSI indicator 250. The HMI 220, the BSI indicator 250, and the steering device 420 are examples of "in-car instruments". The HMI 220 and the BSI indicator 250 are examples of "output units", and the steering device 420 is an example of a "steering control unit". The in-car communication device 240 is an example of a "vehicle side communication unit".

For example, the camera 210 is a digital camera utilizing a solid-state image capturing element, such as a charge coupled device (CCD) or a complementary metal oxide semiconductor (CMOS). One or a plurality of cameras 210 are attached to arbitrary locations in the subject vehicle M. In a case of capturing an area ahead, the camera 210 is attached to an upper unit in a front windshield or the rear surface of a rearview mirror. For example, the camera 210 captures an image of a nearby area of the subject vehicle M in a periodically repeated manner. The camera 210 may be a stereo camera.

The radar 212 emits electric waves such as millimeter waves to a nearby area of the subject vehicle M and detects at least the position (distance and azimuth) of an object by detecting electric waves (reflected waves) reflected by the object. For example, in order to set a region surrounding the subject vehicle M in its entirety as a detection region, the radar 212 is installed in each of the locations, such as a front grille, a front bumper, door mirrors, the insides of head lamps, locations in the vicinity of side marker lamps on the vehicle front end side, a trunk lid, the insides of tail lamps, and locations in the vicinity of side marker lamps on the vehicle rear end side. The radar 212 may detect the position and the speed of an object by a frequency modulated continuous wave (FM-CW) method.

The finder 214 is light detection and ranging or laser imaging detection and ranging (LIDAR) measuring scattered light of irradiation light and detecting the distance to a target. For example, in order to set a region surrounding the subject vehicle M in its entirety as a detection region, the finder 214 is installed in each of the locations, such as a front grille, a front bumper, door mirrors, the insides of head lamps, locations in the vicinity of side marker lamps on the vehicle front end side, a trunk lid, the insides of tail lamps, locations in the vicinity of side marker lamps on the vehicle rear end side, an engine hood, and a roof.

The object recognition device 216 recognizes the position, the type, the speed, the moving direction, and the like of an object by performing sensor fusion processing with respect to detection results acquired by a part or all of the camera 210, the radar 212, and the finder 214. For example, a recognized object is a type of an object such as a vehicle, a guardrail, a utility pole, a pedestrian, or a road sign. The object recognition device 216 outputs a recognition result to the driving support apparatus 300. The object recognition device 216 may output a part of information input from the camera 210, the radar 212, or the finder 214 to the driving support apparatus 300 without any change.

The HMI 220 presents various pieces of information to an occupant of the subject vehicle M and receives an input operation from an occupant. For example, the HMI 220 includes a display 222, a speaker 224, a driving support-starting switch 226, and the like. For example, the instruments included in the HMI 220 are attached to arbitrary locations, such as each part of an instrument panel, seats including a driver's seat, a passenger seat, and a rear seat, and doors of the vehicle.

For example, the display 222 is a liquid crystal display (LCD) or an organic electroluminescence (EL) display. The display 222 may be a touch panel integrated with a touch pad.

Figure 10:
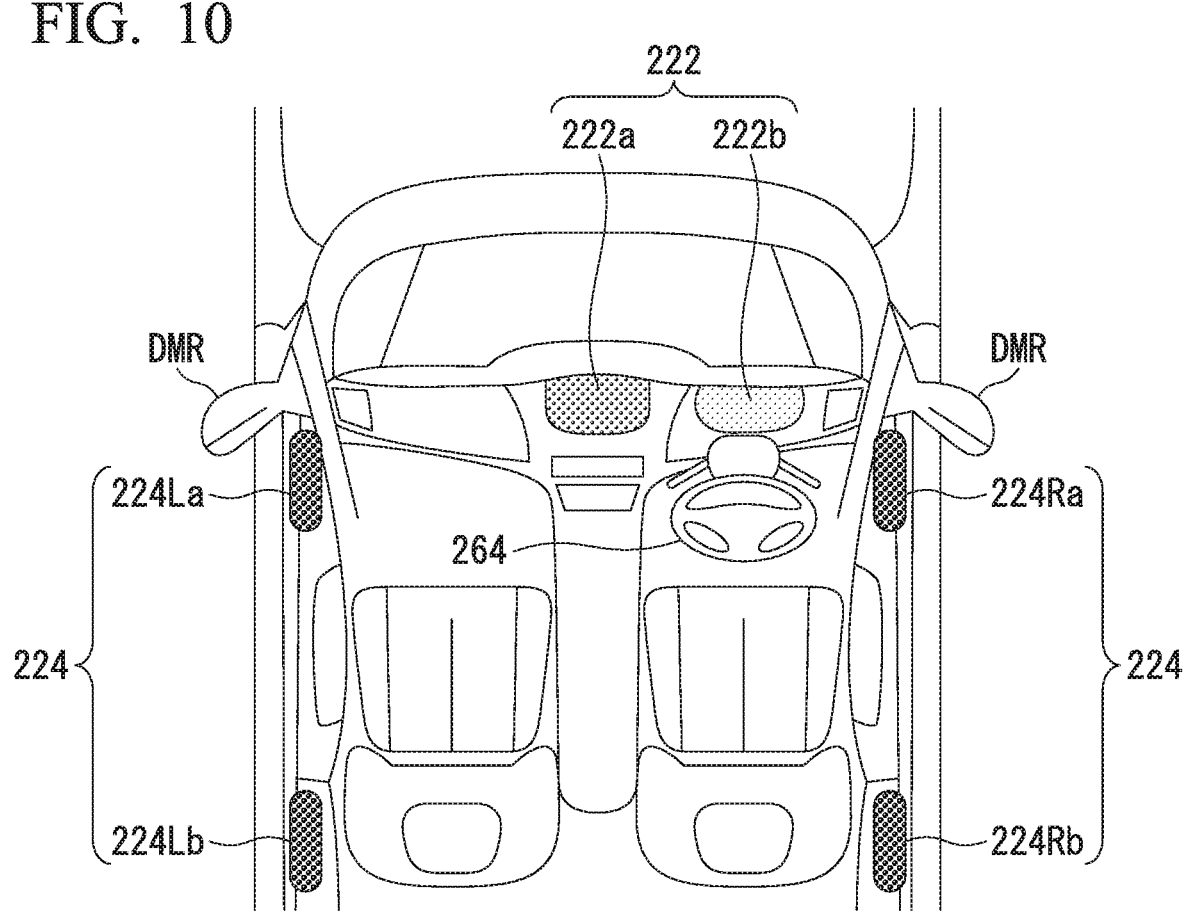
FIG. 10 is a view illustrating an example of the inside of a vehicle cabin of a subject vehicle when seen from above.

FIG. 10 is a view illustrating an example of the inside of a vehicle cabin of the subject vehicle M when seen from above. As illustrated in the diagram, for example, the display 222 is positioned below (222a, in the diagram) the front windshield and is installed on a dashboard provided in front of the driver's seat and the passenger seat. For example, the display 222 may be installed in front (222b, in the diagram) of the driver's seat and may function as an instrument panel displaying meters, such as a speedometer and a tachometer.

For example, the speaker 224 may be installed in the vicinity (224La, in the diagram) of a door closest to the passenger seat, in the vicinity (224Ra, in the diagram) of a door closest to the driver's seat, in the vicinity (224Lb, in the diagram) of a door closest to the rear seat behind the passenger seat, and in the vicinity (224Rb, in the diagram) of a door closest to the rear seat behind the driver's seat. For example, the speaker 224 is controlled by the driving support apparatus 300 and outputs a voice, a warning sound or the like.

The driving support-starting switch 226 is a switch for causing the driving support apparatus 300 to start driving support control. For example, driving support control is a control mode of controlling any one or both the traveling driving force output device 400 and the brake device 410, and the steering device 420. On the other hand, when the driving support-starting switch 226 is not operated, that is, when the driving support apparatus 300 does not execute driving support control, manual driving is performed. In manual driving, the traveling driving force output device 400, the brake device 410, and the steering device 420 are controlled in response to an operation of an occupant on the subject vehicle M with respect to the driving operation tool 260 (in accordance with the operation amount of the driving operation tool 260).

For example, the vehicle sensor 230 includes a vehicle speed sensor detecting the speed of the subject vehicle M, an acceleration sensor detecting acceleration, a yaw rate sensor detecting the angular velocity about a vertical axis, and an azimuth sensor detecting the direction of the subject vehicle M. For example, the speed detected by the vehicle speed sensor includes at least one of the speed of the subject vehicle M in the forward moving direction (hereinafter, a longitudinal velocity) and the speed of the subject vehicle M in the vehicle width direction (hereinafter, a lateral velocity). For example, acceleration detected by the acceleration sensor includes at least one of acceleration of the subject vehicle M in the forward moving direction (hereinafter, a longitudinal acceleration) and acceleration of the subject vehicle M in the vehicle width direction (hereinafter, a lateral acceleration). Each of the sensors included in the vehicle sensor 230 outputs a detection signal indicating a detection result to the driving support apparatus 300.

For example, the in-car communication device 240 performs radio communication utilizing a cellular network, a Wi-Fi network, the Bluetooth (registered trademark), or dedicated short range communication (DSRC). For example, the in-car communication device 240 communicates with the server apparatus 100 and acquires the alarm-restraining spot information DT3.

For example, the navigation device 245 includes a global navigation satellite system (GNSS) receiver 245A, a navigation HMI 245B, and a route determination unit (route determiner) 245C and retains the map information DT1 in a storage such as an HDD or a flash memory. The GNSS receiver 245A specifies the position of the subject vehicle M based on a signal received from a GNSS satellite (including a quasi-zenith satellite). The position of the subject vehicle M may be specified or complemented by an inertial navigation system (INS) utilizing an output of the vehicle sensor 230. The navigation HMI 245B includes a display, a speaker, a touch panel, keys, and the like. The navigation HMI 245B may be partially or entirely in common with the HMI 220. For example, with reference to the map information DT1, the route determination unit 245C determines a route (for example, including information related to a transit spot when traveling to a destination) from the position of the subject vehicle M (or an arbitrarily input position) specified by the GNSS receiver 245A to a destination input by an occupant using the navigation HMI 245B.

The navigation device 245 presents route guide using the navigation HMI 245B based the route determined by the route determination unit 245C.

For example, the BSI indicator 250 causes a part on a mirror surface of a door mirror DMR to display a predetermined image 250a. For example, the predetermined image 250a is an image for notifying an occupant of a nearby vehicle which is approaching the subject vehicle M or is estimated to be approaching at a certain future time point.

Figure 11:
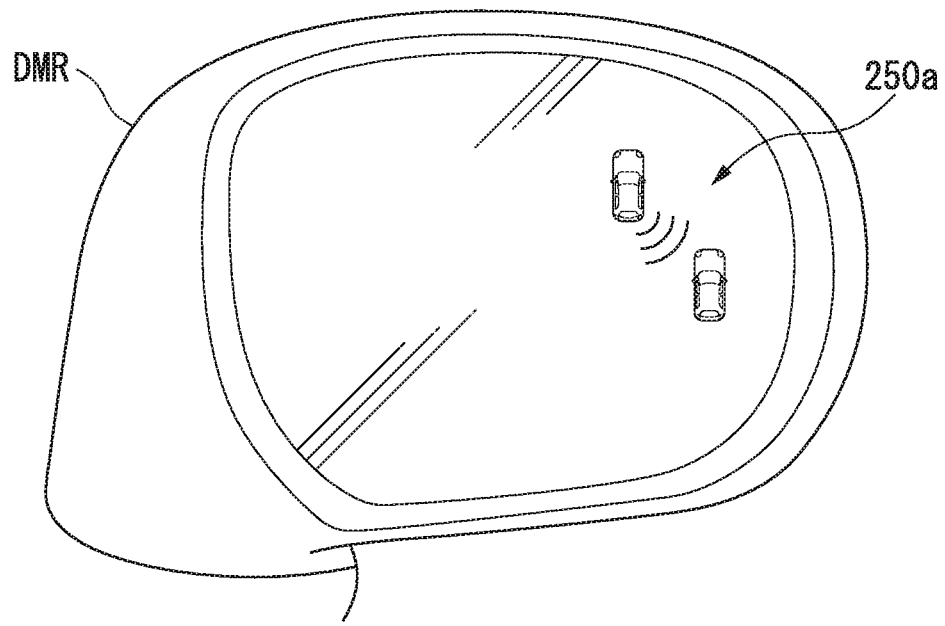
FIG. 11 is a view illustrating an example of a door mirror.

FIG. 11 is a view illustrating an example of the door mirror DMR. As in the illustrated example, a part on the mirror surface of the door mirror DMR displays the predetermined image 250a indicating that a nearby vehicle is approaching the subject vehicle M.

For example, the driving operation tool 260 includes various operation tools, such as a turn signal lever (indicator switch) 262 for switching between an operation and a halt of a turn signal (indicator), a steering wheel 264, an accelerator pedal, a brake pedal, and a shift lever. For example, a detection unit detecting an operation amount of an operation performed by an occupant is attached to each of the operation tools of the driving operation tool 260. For example, a lever position detection unit (lever position detector) 262a is provided in the turn signal lever 262. The lever position detection unit ( ) 262a detects the position of the turn signal lever 262. The detection unit provided in the accelerator pedal or the brake pedal detects the stepped amount of the pedal, and the detection unit provided in the steering wheel 264 detects the steering angle, the steering torque, and the like of the steering wheel 264. Then, each of the detection units (also including the lever position detection unit 262a) outputs a detection signal indicating a detection result to any one or both the driving support apparatus 300; and the traveling driving force output device 400, the brake device 410, and the steering device 420.

A vibrator 264a is provided in the steering wheel 264. The vibrator 264a operates in response to control of the driving support apparatus 300. The operated vibrator 264a vibrates the steering wheel 264.

Before the driving support apparatus 300 is described, the traveling driving force output device 400, the brake device 410, and the steering device 420 will be described. The traveling driving force output device 400 outputs a traveling driving force (torque) to driving wheels such that the subject vehicle M can travel. For example, the traveling driving force output device 400 includes a combination of an internal-combustion engine, an electric motor, a transmission, and the like, and a power electronic control unit (ECU) controlling these. The power ECU controls the above configuration in accordance with information input from the driving support apparatus 300 or information input from the driving operation tool 260.

For example, the brake device 410 includes a brake caliper, a cylinder transferring a hydraulic pressure to the brake caliper, an electric motor causing the cylinder to generate a hydraulic pressure, and a brake ECU. The brake ECU controls the electric motor in accordance with information input from the driving support apparatus 300 or information input from the driving operation tool 260, such that a braking torque in response to a braking operation is output to each of the wheels. The brake device 410 may include a mechanism, as a back-up, transferring a hydraulic pressure, which is generated due to an operation of the brake pedal included in the driving operation tool 260, to the cylinder via a master cylinder. The brake device 410 is not limited to the configuration described above. The brake device 410 may be an electronic control-type hydraulic brake device which controls an actuator in accordance with information input from the driving support apparatus 300 to transfer a hydraulic pressure of the master cylinder to the cylinder.

For example, the steering device 420 includes a steering ECU and an electric motor. For example, the electric motor applies a force to a rack-and-pinion mechanism to change the direction of turning wheels. The steering ECU drives the electric motor in accordance with information input from the driving support apparatus 300 or information input from the driving operation tool 260 to change the direction of the turning wheels.

[Configuration of Driving Support Apparatus]

For example, the driving support apparatus 300 includes an outside recognition unit (outside recognizer) 302, a subject vehicle position recognition unit (subject vehicle position recognizer) 304, an overriding control unit (overriding controller) 306, and an instrument operation control unit (instrument operation controller) 310.

For example, a part or all of the constituent elements of the driving support apparatus 300 are realized by a hardware processor, such as a CPU, executing a program (software). In addition, a part or all of these constituent elements may be realized by hardware (including circuitry), such as LSI, ASIC, FPGA, and GPU, or may be realized by software and hardware in a cooperative form. These constituent elements may be realized by one processor or may be realized by a plurality of processors. In the latter case, for example, the driving support apparatus 300 may be a system in which a plurality of ECUs are combined.

The outside recognition unit 302 recognizes a state of the position, the speed, and the acceleration of a nearby vehicle based on information input from the camera 210, the radar 212, and the finder 214 via the object recognition device 216. The position of a nearby vehicle may be indicated with the center of gravity or a representative point at a corner or the like of the nearby vehicle, or may be indicated with a region expressed with the contour of the nearby vehicle. The "state" of a nearby vehicle may include acceleration, a jerk, and a "behavior state" of a nearby vehicle (for example, a state of performing a lane change, or a state whether or not a nearby vehicle attempts to perform a lane change). The outside recognition unit 302 may recognize states of objects of different types, such as a guardrail, a utility pole, a parked vehicle, and a pedestrian, in addition to a nearby vehicle.

For example, the subject vehicle position recognition unit 304 recognizes a lane in which the subject vehicle M is traveling (traveling lane) and the relative position and posture of the subject vehicle M with respect to the traveling lane. For example, the subject vehicle position recognition unit 304 recognizes demarcation lines LM of the road from an image captured by the camera 210 and recognizes a lane demarcated by two demarcation lines LM, of the recognized demarcation lines LM, closest to the subject vehicle M as a traveling lane. Then, the subject vehicle position recognition unit 304 recognizes the position or the posture of the subject vehicle M with respect to the recognized traveling lane.

Figure 12:
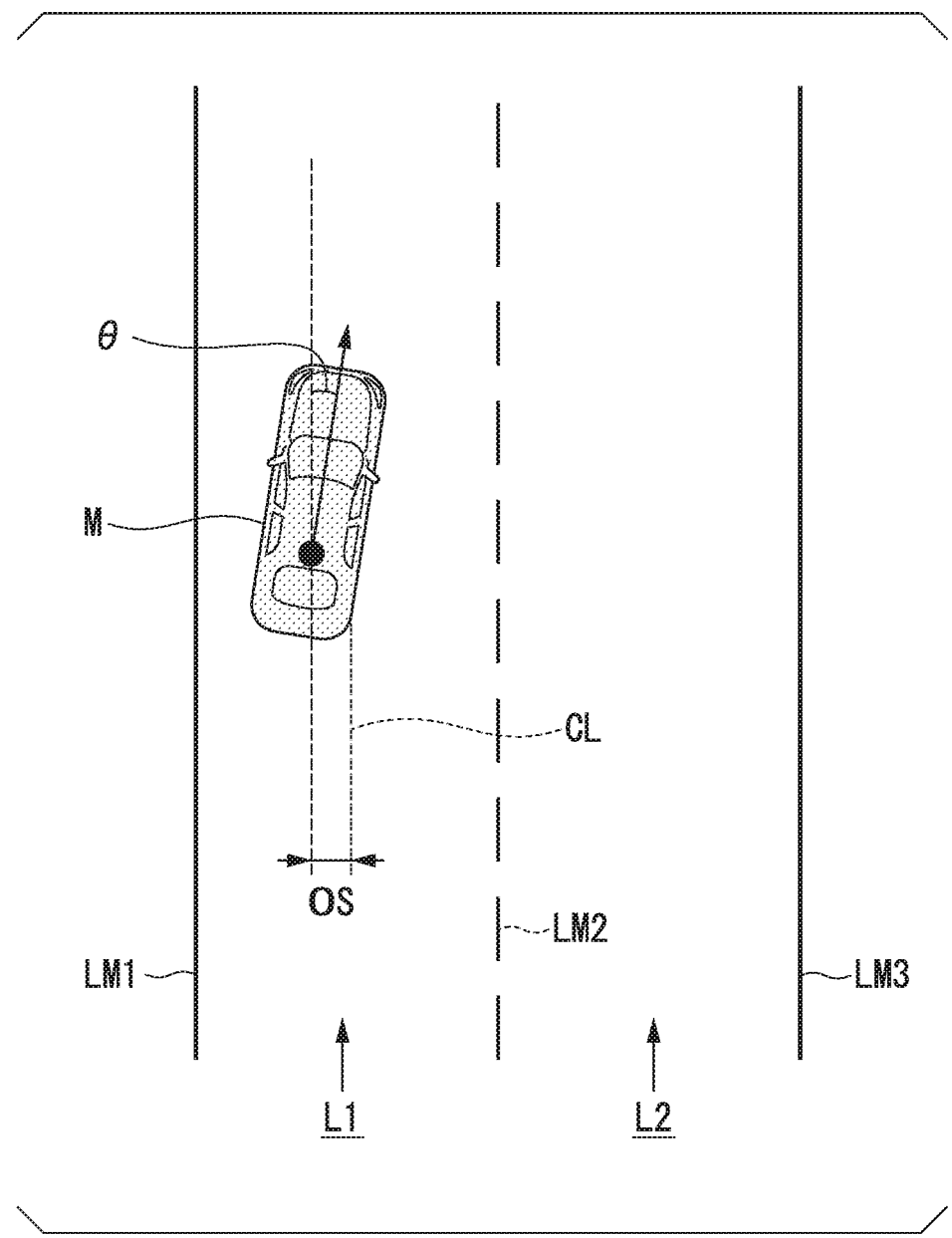
FIG. 12 is a view illustrating a state in which a subject vehicle position recognition unit recognizes relative position and posture of a subject vehicle with respect to a traveling lane.

FIG. 12 is a view illustrating a state in which the subject vehicle position recognition unit 304 recognizes the relative position and posture of the subject vehicle M with respect to the traveling lane L1. For example, the subject vehicle position recognition unit 304 recognizes the demarcation lines LM1 to LM3 and recognizes a region between the demarcation lines LM1 and LM2 closest to the subject vehicle M as the traveling lane L1 of the subject vehicle M. Then, the subject vehicle position recognition unit 304 recognizes an estrangement OS from a center CL of the traveling lane of a reference point (for example, the center of gravity) of the subject vehicle M, and an angle θ of a line realized by joining the reference points of the subject vehicle M in the forward moving direction with respect to the centers CL of the traveling lane, as the relative position and posture of the subject vehicle M with respect to the traveling lane L1. In place thereof, the subject vehicle position recognition unit 304 may recognize the position of the reference point of the subject vehicle M, and the like with respect to any of side end units of the traveling lane L1, as a relative position of the subject vehicle M with respect to the traveling lane.

For example, the subject vehicle position recognition unit 304 may recognize an adjacent lane adjacent to a subject vehicle lane. For example, the subject vehicle position recognition unit 304 recognizes a region between a demarcation line closed to the subject vehicle M next to the demarcation line of the subject vehicle lane and the demarcation line of the subject vehicle lane, as an adjacent lane. In the example of FIG. 12, for example, the subject vehicle position recognition unit 304 recognizes a region between the demarcation line LM2 of the subject vehicle lane and the demarcation line LM3 close to the subject vehicle M next to the demarcation line LM2, as an adjacent lane L2 on the right.

The overriding control unit 306 determines whether or not an operation of instructing the driving operation tool 260 to override an operation is performed. Overriding an operation denotes that control performed by the instrument operation control unit 310 becomes ineffective and a driving operation of an occupant comes into effect instead when an occupant operates the driving operation tool 260, such as the accelerator pedal, the brake pedal, or the steering wheel 264 with a force (operation amount) equal to or greater than certain magnitude. That is, overriding denotes that the authority of controlling the subject vehicle M is transferred from the vehicle side to the occupant side.

For example, when an operation amount of the brake pedal is greater than an operation amount set in advance, the overriding control unit 306 determines that an operation with respect to the brake pedal is an operation of an overriding instruction. When an operation amount of the accelerator pedal is greater than an operation amount set in advance, the overriding control unit 306 determines that an operation with respect to the accelerator pedal is an operation of an overriding instruction. When an operation amount of the steering wheel 264 is greater than an operation amount set in advance, the overriding control unit 306 determines that an operation with respect to the steering wheel 264 is an operation of an overriding instruction.

When it is determined that an operation with respect to the driving operation tool 260 is an operation of an overriding instruction, the overriding control unit 306 brings driving support control to a halt if it has already been executed by the instrument operation control unit 310. In this case, the control mode of the subject vehicle M switches over from driving support control to manual driving.

For example, when the subject vehicle M performs a lane change, if a nearby vehicle, which may be an obstacle, is present in the lane that is the destination of a lane change, the instrument operation control unit 310 notifies, as a part of driving support control, an occupant of the presence of a nearby vehicle as an alarm and performs steering control (which will hereinafter be referred to as lane deviation restraining control) such that the subject vehicle M does not deviate from the traveling lane.

Figure 13:
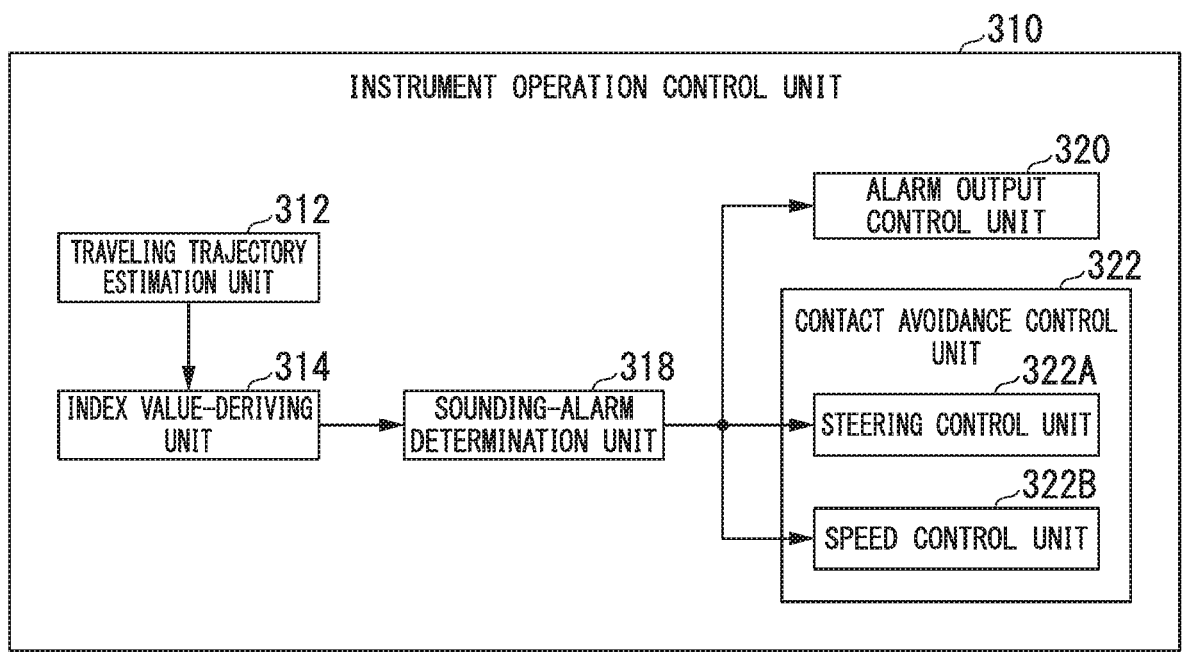
FIG. 13 is a view illustrating an example of an instrument operation control unit.

FIG. 13 is a view illustrating an example of the instrument operation control unit 310. For example, the instrument operation control unit 310 includes a traveling trajectory estimation unit (traveling trajectory estimator) 312, an index value-deriving unit (index value-deriver) 314, a sounding-alarm determination unit (sounding-alarm determiner) 318, an alarm output control unit (alarm output controller) 320, and a contact avoidance control unit (contact avoidance controller) 322.

The traveling trajectory estimation unit 312 estimates a future traveling trajectory of the subject vehicle M from the state of the subject vehicle M. For example, the traveling trajectory estimation unit 312 derives a trajectory as a future traveling trajectory to be plotted by the subject vehicle M, when it is assumed that the current state of the subject vehicle M (for example, the speed and the acceleration) is maintained until a certain future time point, based on the position of the subject vehicle M recognized by the subject vehicle position recognition unit 304, the speed of the subject vehicle M obtained by the vehicle sensor 230, the acceleration, the yaw rate, the steering angle of the steering wheel 264, the stepped amount of the accelerator pedal or the brake pedal, the road shape, and the like.

The traveling trajectory estimation unit 312 estimates a future traveling trajectory of a nearby vehicle (which will hereinafter be referred to as an adjacent vehicle), of one or a plurality of nearby vehicles recognized by the outside recognition unit 302, present in a target region set in an adjacent lane while having the position of the subject vehicle M as a criterion. For example, when it is assumed that the state of a nearby vehicle recognized by the outside recognition unit 302 is maintained till a certain future time point, the traveling trajectory estimation unit 312 derives a trajectory plotted by the nearby vehicle as a future traveling trajectory.

Figure 14:
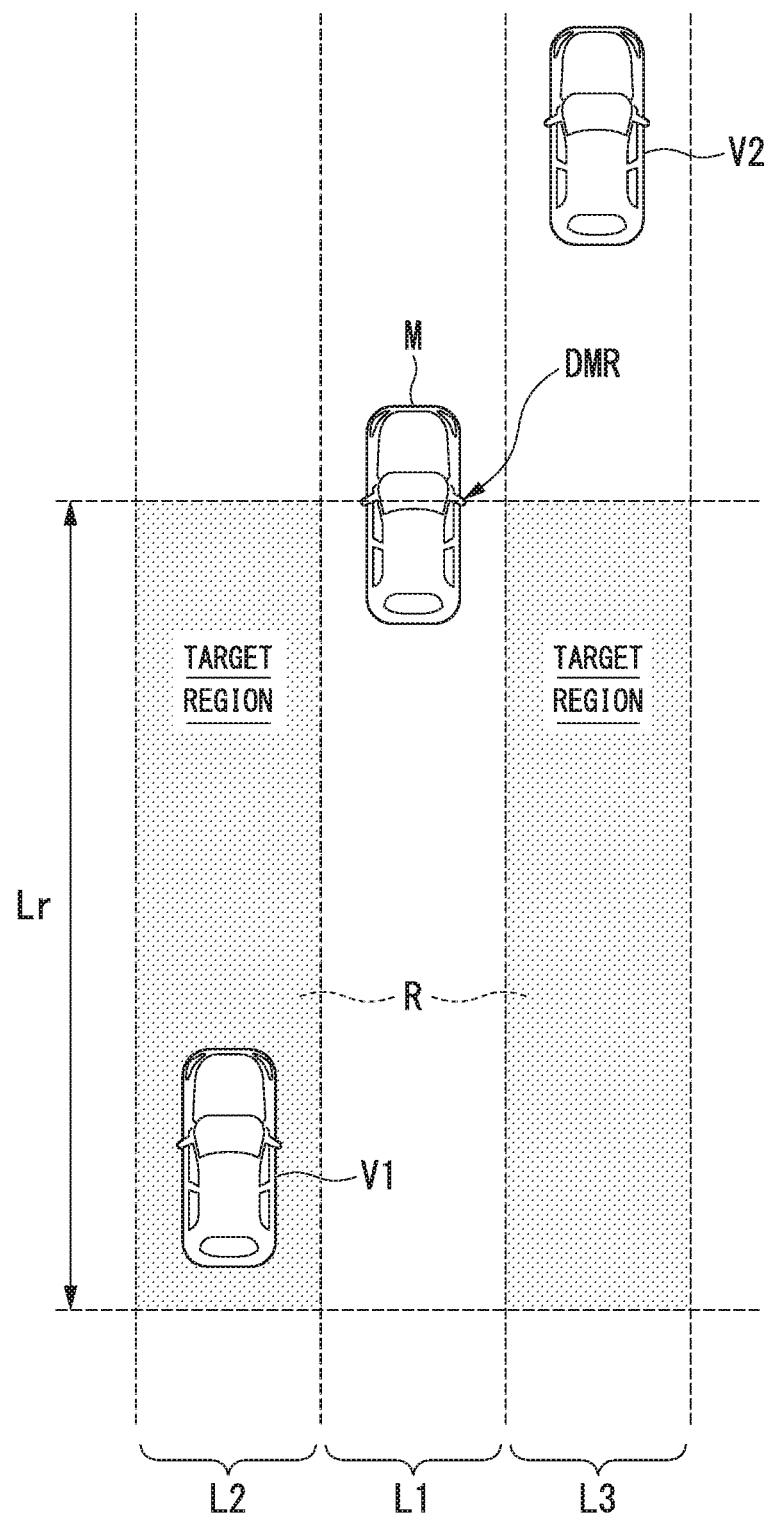
FIG. 14 is a view illustrating an example of a target region.

FIG. 14 is a view illustrating an example of a target region. In the diagram, the reference sign L1 indicates the subject vehicle lane, the reference sign L2 indicates an adjacent lane on the left side of the subject vehicle lane L1 in the forward moving direction of the subject vehicle M, and the reference sign L3 indicates an adjacent lane on the right side of the subject vehicle lane L1 in the forward moving direction of the subject vehicle M. In the diagram, a region indicated with the reference sign R indicates a target region. For example, in each of the adjacent lanes, the target region R is set as a region from an installation position of the door mirror DMR of the subject vehicle M to a rear position separated by a predetermined distance Lr. That is, the target region R is set in a region behind the subject vehicle M. For example, the traveling trajectory estimation unit 312 estimates a future traveling trajectory for a nearby vehicle indicated with the reference sign V1 in the diagram and estimates no future traveling trajectory for a nearby vehicle indicated with the reference sign V2 in the diagram.

For example, the index value-deriving unit 314 derives a distance d between the demarcation line of the subject vehicle lane recognized by the subject vehicle position recognition unit 304, and the subject vehicle M. The index value-deriving unit 314 derives a lateral velocity v1 which is the speed of the subject vehicle M in the vehicle width direction, based on a detection result of the vehicle sensor 230. The index value-deriving unit 314 derives a relative distance x and a relative speed v2 between an adjacent vehicle, of nearby vehicles recognized by the outside recognition unit 302, present within a target region of the adjacent lane, and the subject vehicle M.

The index value-deriving unit 314 compares the traveling trajectory of the subject vehicle M estimated by the traveling trajectory estimation unit 312 and the traveling trajectory of an adjacent vehicle present in a target region, and selects a traveling trajectory interferes with the traveling trajectory of the subject vehicle M from the traveling trajectories of the adjacent vehicle present in the target region. Then, the index value-deriving unit 314 derives a time-to-collision (TTC) between the adjacent vehicle (vehicle which will hereinafter be referred to as a target) plotting the selected traveling trajectory, and the subject vehicle M. For example, the index value-deriving unit 314 derives a value obtained by dividing the relative distance x between the subject vehicle M and a target vehicle by the relative speed v2 between the subject vehicle M and the target vehicle, as the time-to-collision TTC.

The sounding-alarm determination unit 318 determines whether or not an alarm needs to be output for notifying an occupant of the presence of a target vehicle, based on the relative distance x between the target vehicle and the subject vehicle M of various index values derived by the index value-deriving unit 314.

For example, when the relative distance x between the target vehicle and the subject vehicle M is equal to or smaller than a distance threshold value X, the sounding-alarm determination unit 318 determines that an alarm needs to be output. For example, the distance threshold value X is a threshold value for handling an adjacent vehicle traveling side by side with the subject vehicle M within a target region as a target vehicle.

The sounding-alarm determination unit 318 may determine whether or not an alarm needs to be output, based on the time-to-collision TTC ($=x/v2$) between a target vehicle and the subject vehicle M. For example, when the time-to-collision TTC between a target vehicle and the subject vehicle M is equal to or smaller than a time-to-collision threshold value TTC1, the sounding-alarm determination unit 318 determines that an alarm needs to be output. For example, the time-to-collision threshold value TTC1 is a threshold value for handling an adjacent vehicle attempting to overtake a subject vehicle at a speed higher than the speed of the subject vehicle M from behind the subject vehicle M in an adjacent lane, as a target vehicle.

The sounding-alarm determination unit 318 determines whether or not an alarm needs to be output, based on the alarm-restraining spot information DT3 acquired by the in-car communication device 240. For example, when an alarm-restraining spot indicated by the alarm-restraining spot information DT3 is present within a predetermined distance ahead in the subject vehicle lane, the sounding-alarm determination unit 318 determines that an alarm does not need to be output. When no alarm-restraining spot is present, it is determined that an alarm needs to be output.

The sounding-alarm determination unit 318 may determine whether or not an alarm needs to be output, in accordance with an operational situation of the turn signal. For example, when the turn signal on the adjacent lane side, on which an adjacent vehicle as a target vehicle is present, is operated, the sounding-alarm determination unit 318 determines that an alarm needs to be output.

When it is determined that an alarm needs to be output by the sounding-alarm determination unit 318, the alarm output control unit 320 controls various in-car instruments, such as the display 222, the speaker 224, and the BSI indicator 250, to output an alarm.

When it is determined that an alarm needs to be output by the sounding-alarm determination unit 318, the contact avoidance control unit 322 executes lane deviation restraining control.

For example, the contact avoidance control unit 322 includes a steering control unit (steering controller) 322A and a speed control unit (speed controller) 322B. As lane deviation restraining control, the steering control unit 322A operates the vibrator 264a to vibrate the steering wheel 264.

Figure 15:
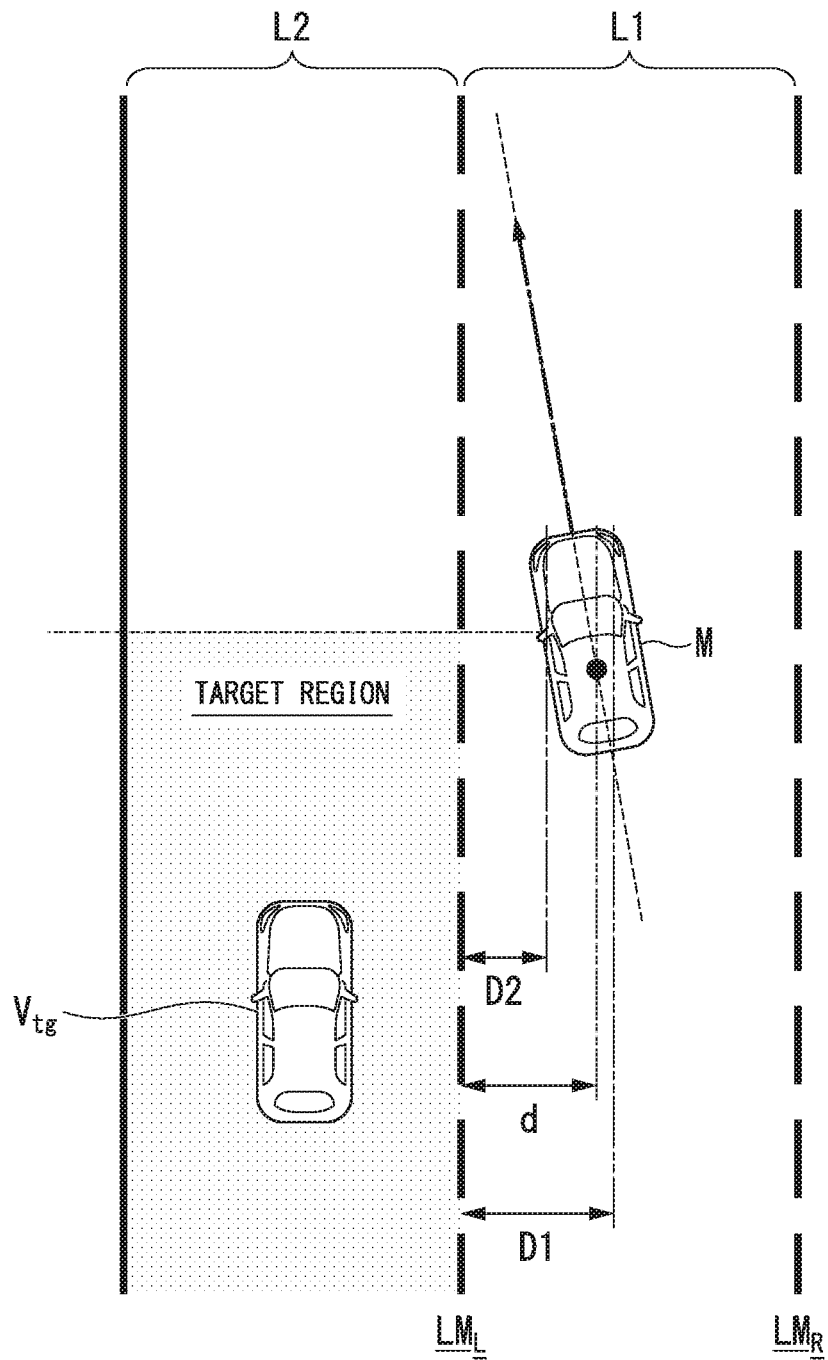
FIG. 15 is a view illustrating an example of a scenario in which lane deviation restraining control is executed.

FIG. 15 is a view illustrating an example of a scenario (scene) in which lane deviation restraining control is executed. In the diagram, the reference sign $LM_L$ indicates the demarcation line on the left side in the forward moving direction of two demarcation lines demarcating the subject vehicle lane L1, and the reference sign $LM_R$ indicates the demarcation line on the right side in the forward moving direction of two demarcation lines demarcating the subject vehicle lane L1. The illustrated example indicates that an adjacent vehicle in the adjacent lane L2 on the left side is present in a blind region. In the diagram, the reference sign $V_{tg}$ indicates a target vehicle.

For example, when the subject vehicle M approaches the demarcation line $LM_L$ such that the distance d between the demarcation line $LM_L$ and the subject vehicle M becomes equal to or smaller than a first distance threshold value D1, the steering control unit 322A operates the vibrator 264a as lane deviation restraining control to vibrate the steering wheel 264. Accordingly, it is possible to urge an occupant to operate the steering wheel 264 and to travel at the center of the lane.

After the steering wheel 264 is vibrated, when there is no operation of an occupant with respect to the steering wheel 264 (when the steering angle or the steering torque is smaller than the threshold value) and the subject vehicle M further approaches the demarcation line $LM_L$ such that the distance d between the demarcation line $LM_L$ and the subject vehicle M becomes equal to or smaller than a second distance threshold value D2 smaller than the first distance threshold value D1, or when a predetermined time elapses after the steering wheel 264 is vibrated, the steering control unit 322A performs steering control as lane deviation restraining control such that the subject vehicle M returns to the center side of the lane. Similar to the first distance threshold value D1, the second distance threshold value D2 is a distance in the vehicle width direction when a length set in advance is taken to the center side of the lane having the demarcation line demarcating the subject vehicle lane as a criterion. For example, the second distance threshold value is set to correspond to a distance to an extent that a part of the vehicle body of the subject vehicle M crosses the demarcation line when the subject vehicle M approaches the demarcation line while being seen from above such that the distance becomes equal to or smaller than the second distance threshold value D2.

When a lane deviation estimated time TTLC ($=d/v1$) obtained by dividing the distance d by the lateral velocity v1 of the subject vehicle M is equal to or smaller than a second time threshold value TTLC2, the steering control unit 322A may perform steering control as lane deviation restraining control such that the subject vehicle M returns to the center side of the lane. For example, the second time threshold value TTLC2 is set to a time shorter than that of a first time threshold value TTLC1.

When lane deviation restraining control is executed by the steering control unit 322A, the alarm output control unit 320 may cause the display 222 of the HMI 220 to display an image or cause the speaker 224 to output a voice to notify an occupant of the subject vehicle M which tends to deviate from the subject vehicle lane.

Figure 16:
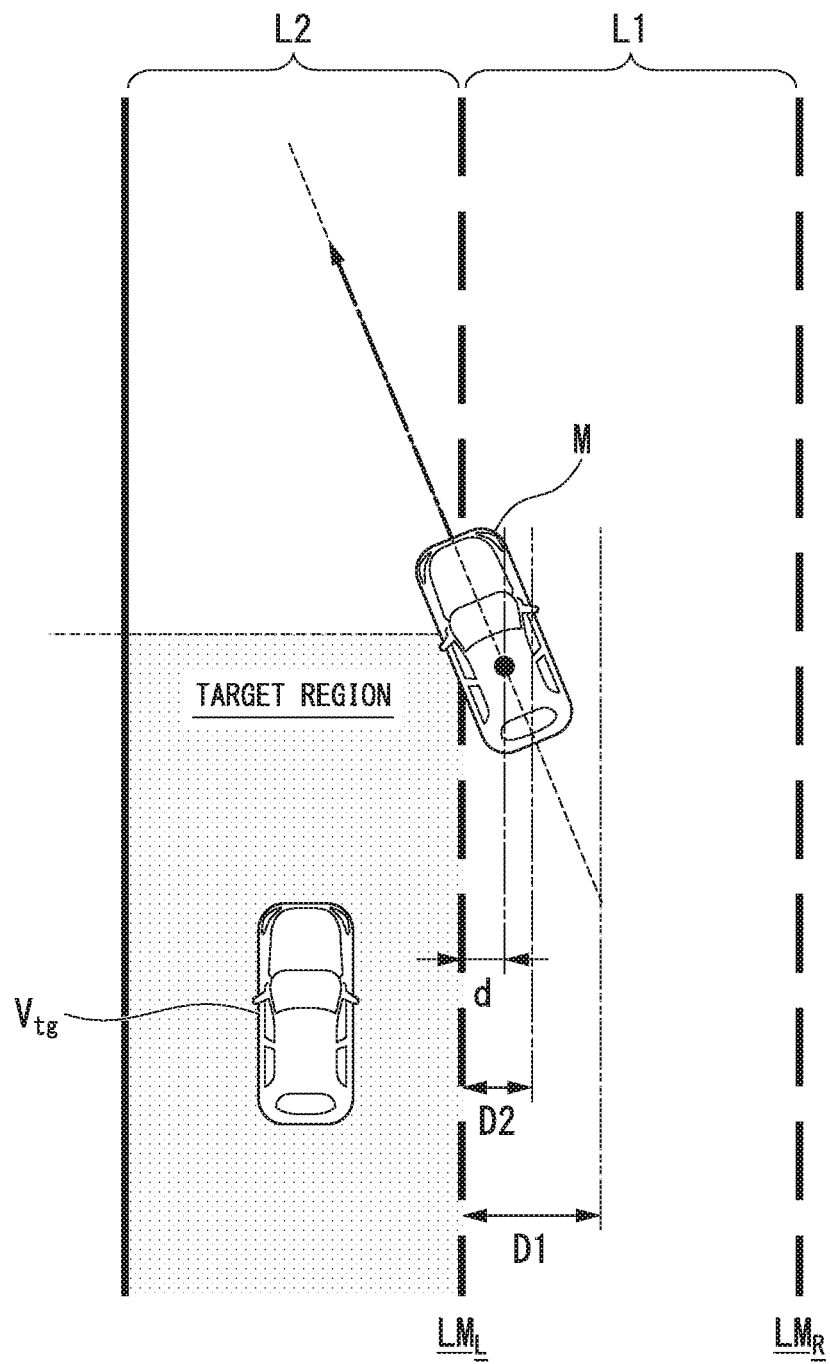
FIG. 16 is a view illustrating another example of a scenario in which lane deviation restraining control is executed.

FIG. 16 is a view illustrating another example of a scenario in which lane deviation restraining control is executed. As illustrated in the diagram, when the subject vehicle M approaches the demarcation line $LM_L$ such that the distance d between the demarcation line $LM_L$ and the subject vehicle M becomes equal to or smaller than the second distance threshold value D2, that is, when a part of the vehicle body of the subject vehicle M crosses the demarcation line $LM_L$, the steering control unit 322A causes a reaction force to be output to the steering wheel 264 by controlling the steering device 420. For example, a reaction force is a torque in a direction opposite to a steering torque applied to a shaft (rotary shaft) of the steering wheel 264 in response to an operation of the steering wheel 264 performed by an occupant. When a reaction force is output to the shaft of the steering wheel 264 in this manner, it is difficult for the steering wheel 264 to rotate in the left direction, so that the subject vehicle M can be restrained from invading the adjacent lane L2 on the left in which the target vehicle $V_{tg}$ is present.

As lane deviation restraining control, for example, the speed control unit 322B may control the traveling driving force output device 400 and the brake device 410 to control the speed of the subject vehicle M such that the subject vehicle M does not come into contact with a target vehicle.

[Example of Scenario of Executing Driving Support Control]

Figure 17:
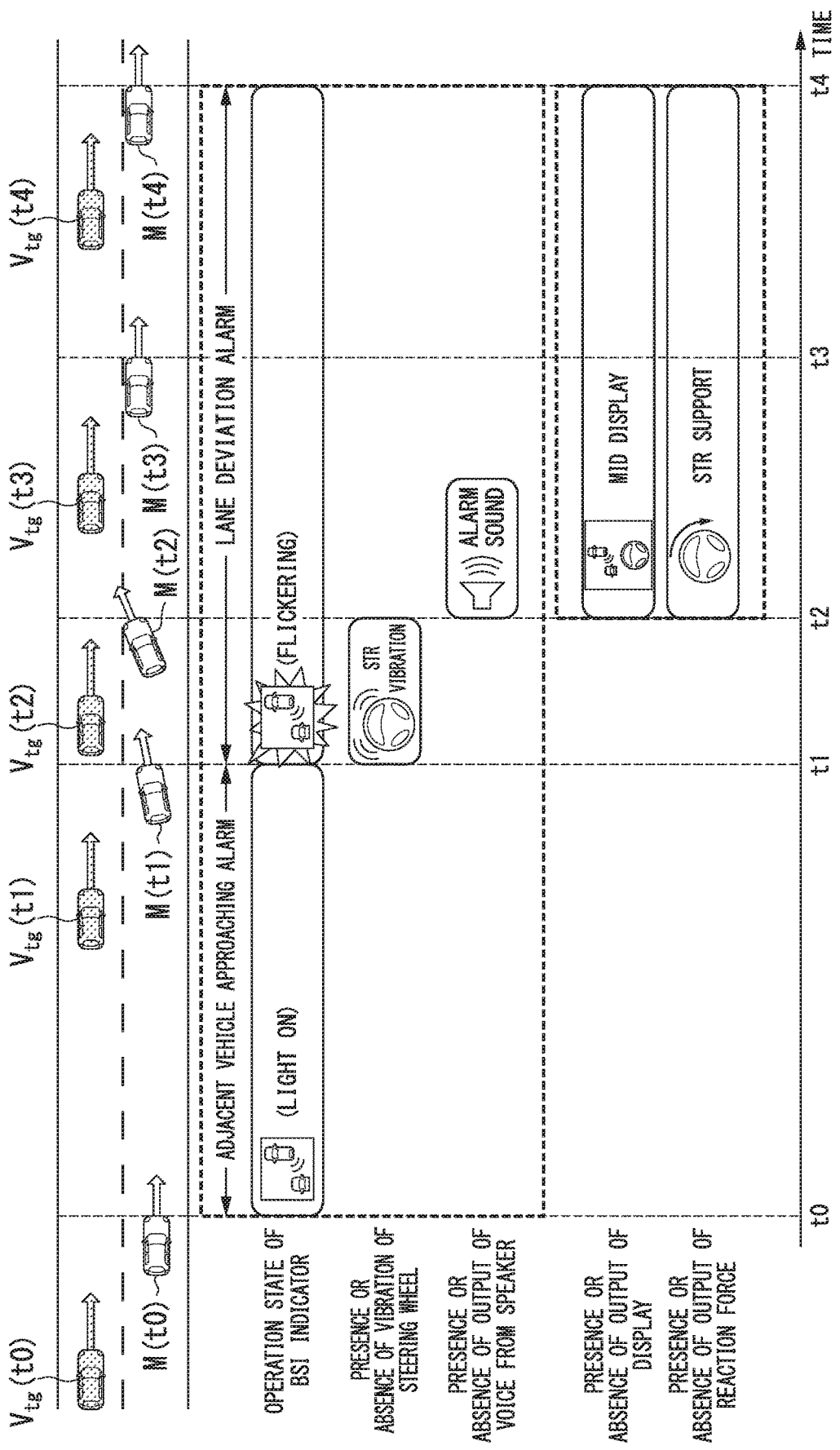
FIG. 17 is a view illustrating a scenario in which a target vehicle is approaching a subject vehicle from behind in an adjacent lane, and details of driving support control.

Hereinafter, various types of scenarios in which driving support control is executed by the driving support apparatus 300 will be described. FIG. 17 is a view illustrating a scenario in which the target vehicle $V_{tg}$ is approaching the subject vehicle M from behind in an adjacent lane, and details of driving support control.

In the diagram, the reference sign t0 indicates a time at which the target vehicle $V_{tg}$ is recognized in a target region. At the time t0, the alarm output control unit 320 operates the BSI indicator 250 to cause a part on the mirror surface of the door mirror DMR to display the predetermined image 250*a* (in the diagram, (light on)). Operating the BSI indicator 250 to cause a part on the mirror surface of the door mirror DMR to display the predetermined image 250*a* is an example of a "predetermined operation".

At a time t1, the turn signal of the subject vehicle M is not operated, and the distance d to the demarcation line is in a situation of being equal to or smaller than the first distance threshold value D1. In such a situation, the alarm output control unit 320 controls the BSI indicator 250 to cause the predetermined image 250*a* displayed on the mirror surface of the door mirror DMR to flicker (in the diagram, (flickering)). Causing the predetermined image 250*a* displayed on the mirror surface of the door mirror DMR to flicker is another example of a "predetermined operation".

Since the distance d to the demarcation line is equal to or smaller than the first distance threshold value D1, the steering control unit 322A operates the vibrator 264*a* to vibrate the steering wheel 264 (in the diagram, (STR vibration)). At a time t2, the turn signal of the subject vehicle M is not operated, and the distance d to the demarcation line is in a situation of being equal to or smaller than the second distance threshold value D2. In such a situation, the alarm output control unit 320 causes the speaker 224 to output an alarm sound (in the diagram, (alarm sound)). In the illustrated example, since the subject vehicle M has approached an adjacent lane on the left side, the alarm output control unit 320 causes the speaker 224Lb installed on the left rear end side to output an alarm sound. Vibrating the steering wheel 264 and causing the speaker 224 to output an alarm sound are another example of a "predetermined operation".

Since the distance d to the demarcation line is equal to or smaller than the second distance threshold value D2, as lane deviation restraining control, the steering control unit 322A causes the display 222 to display, as an image, that the subject vehicle M itself is approaching the target vehicle $V_{tg}$ (in the diagram, (multi information display (MID) display)), and a reaction force is output to the steering wheel 264 (in the diagram, (STR support)). In the illustrated example, since the subject vehicle M is approaching an adjacent lane on the left side, the steering control unit 322A causes a reaction force to be output in the same direction as that of the steering torque generated when the steering wheel 264 is rotated to the right side. Causing a reaction force to be output to the steering wheel 264 is another example of a "predetermined operation".

At a time t3, as a result of lane deviation restraining control, the subject vehicle M returns to the subject vehicle lane. In such a case, at a time point from a predetermined elapsed time after the subject vehicle M has returned to the subject vehicle lane, or a time point at which the subject vehicle M has traveled a predetermined distance (in the diagram, a time t4), the instrument operation control unit 310 ends driving support control, such as alarm outputting control or lane deviation restraining control.

Figure 18:
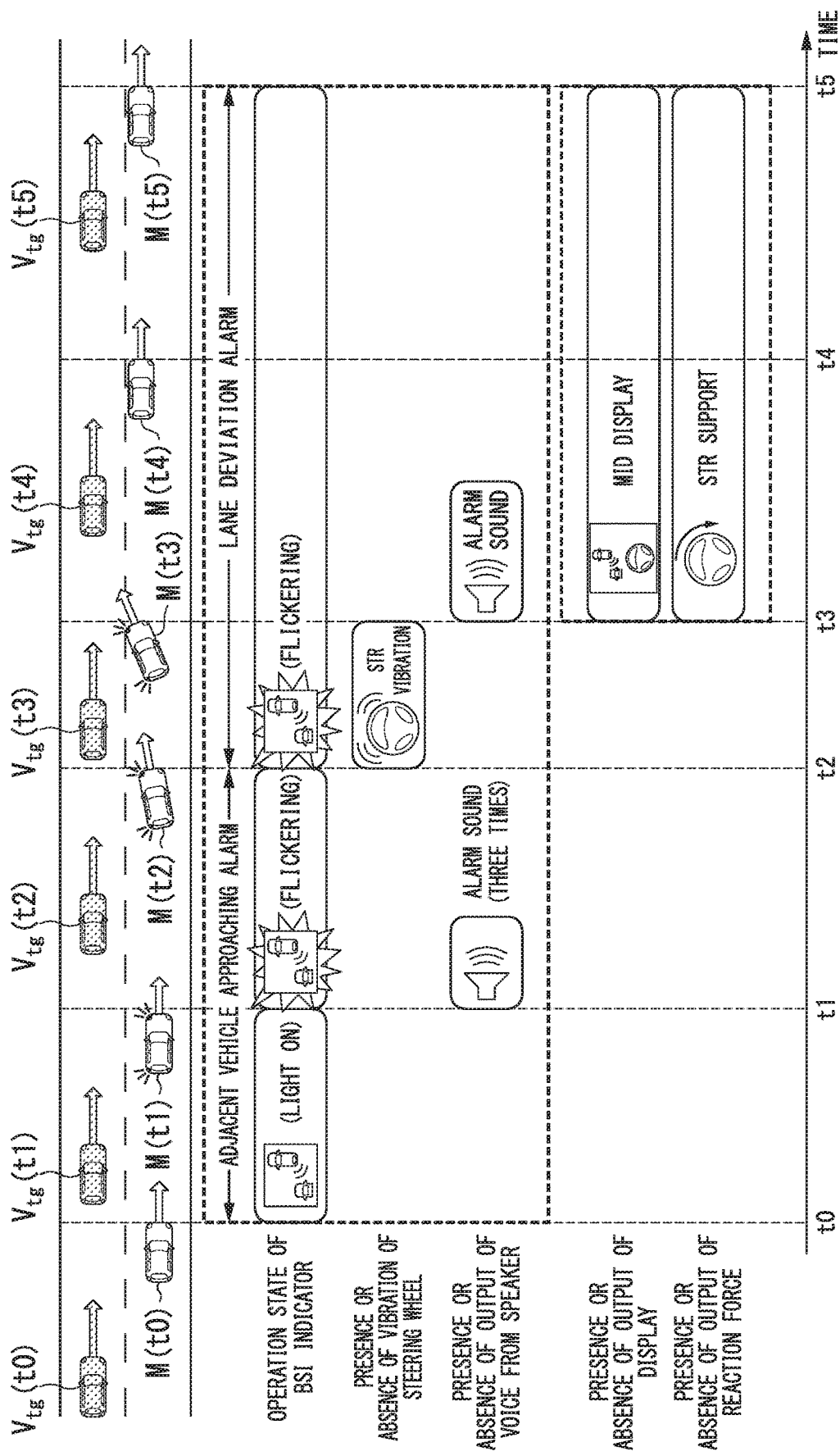
FIG. 18 is a view illustrating a scenario in which a target vehicle is approaching a subject vehicle M from behind in an adjacent lane, and details of driving support control.

FIG. 18 is a view illustrating a scenario in which the target vehicle $V_{tg}$ is approaching the subject vehicle M from behind in an adjacent lane, and details of driving support control. In the example of FIG. 17, details of driving support control in a state in which the target vehicle $V_{tg}$ is positioned behind the subject vehicle M and the turn signal is not operated have been described. In the example of FIG. 18, the details of driving support control in a state in which the target vehicle $V_{tg}$ is positioned behind the subject vehicle M and the turn signal is operated will be described.

For example, the time t1 in FIG. 18 indicates a time at which the turn signal of the subject vehicle M on the left adjacent lane side starts to operate in a situation in which the target vehicle $V_{tg}$ is present in a target region. In such a case, it is postulated that an occupant instructs the subject vehicle M to perform a lane change, without recognizing the presence of the target vehicle $V_{tg}$. Therefore, even when the subject vehicle M does not approach the demarcation line, the alarm output control unit 320 controls the BSI indicator 250 to cause the predetermined image 250*a* displayed on the mirror surface of the door mirror DMR to flicker at the time point of the time t1 (in the diagram, (flickering)). The alarm output control unit 320 causes the speaker 224 (the speaker 224Lb installed on the left rear end side) to output an alarm sound a predetermined number of times (three times in the illustrated example) at the timing the predetermined image 250*a* flickers. Accordingly, it is possible to draw the attention of the occupant who has instructed the subject vehicle M to perform a lane change, in a manner stronger than that before the turn signal is operated.

[Example of Scenario of not Executing Driving Support Control]

Figure 19:
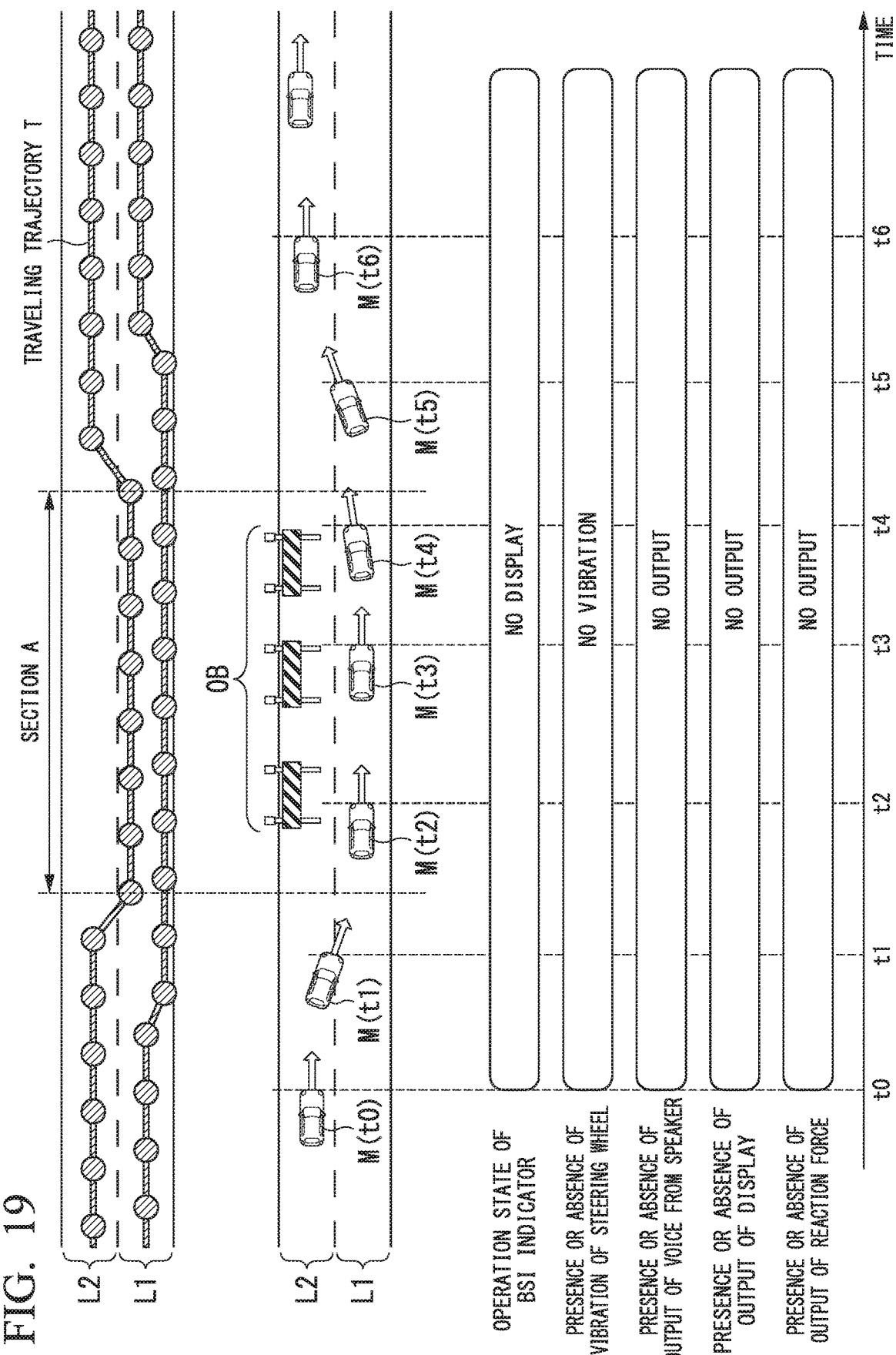
FIG. 19 is a view illustrating a scenario in which an alarm-restraining spot is present in a route of a subject vehicle.

Hereinafter, a scenario in which driving support control is not executed by the driving support apparatus 300 will be described. FIG. 19 is a view illustrating a scenario in which an alarm-restraining spot is present in a route of the subject vehicle M. In the illustrated example, the traveling trajectory T of the probe vehicle is not present in a section A of the lane L2 of a route in which the subject vehicle M travels, and a plurality of traveling trajectories T of the probe vehicle are present in the section A of the lane L1. Therefore, the alarm-restraining spot determination unit 126 of the server apparatus 100 determines that an alarm-restraining spot is present in the lane L2. Then, the communication control unit 128 of the server apparatus 100 transmits the alarm-restraining spot information DT3 indicating that an alarm-restraining spot is present in the section A of the lane L2, to a vehicle in which the vehicle control system 200 is mounted.

When such alarm-restraining spot information DT3 is received by the in-car communication device 240, the sounding-alarm determination unit 318 determines that an alarm does not need to be output while the subject vehicle M is traveling in the section A of the lane L2. In this case, the alarm output control unit 320 does not output an alarm from various in-car instruments, such as the display 222, the speaker 224, and the BSI indicator 250, and the contact avoidance control unit 322 does not execute lane deviation restraining control. As a result, for example, at the time t1, it is possible to restrain (stop) an alarm from being output due to the obstacle OB misrecognized as the target vehicle $V_{tg}$, when an occupant of the subject vehicle M operates the steering wheel 264 to perform a lane change of the subject vehicle M from the lane L2 to the lane L1 and then to perform a lane change of the subject vehicle M to the original lane L2 in order to avoid the obstacle OB. More specifically, in the stages of the times t3 to t5, since the obstacle OB is positioned behind the subject vehicle M, an alarm is supposed to be output to notify an occupant of the presence of the obstacle OB in principle. In contrast, in the present embodiment, a spot having high probability of the presence of the obstacle OB is recognized as an alarm-restraining spot based on the pattern of the traveling trajectory T of the probe vehicle which has already traveled in advance in the route in which the subject vehicle M is scheduled to travel. Therefore, an alarm can be prevented from being output when the subject vehicle M simply passes by the obstacle OB in an adjacent lane.

When the subject vehicle M performs a lane change from the lane L2 to the lane L1 before the section A which is an alarm-restraining spot, there are cases in which another vehicle is recognized by the outside recognition unit 302 in the lane L2 before a lane change is performed. In this case, for example, at the time point of the time t2, since the different vehicle is positioned behind the subject vehicle M, an alarm is supposed to be output to notify an occupant of the presence of the different vehicle in principle. However, in the present embodiment, since an output of an alarm is restrained until the subject vehicle M passes through an alarm-restraining spot, an alarm is restrained from being output due to the presence of the obstacle OB in the section A. Moreover, an alarm can also be restrained from being output due to another vehicle present in the lane L2 before a lane change is performed.

[Processing Flow of Instrument Operation Control Unit]

Figure 20:
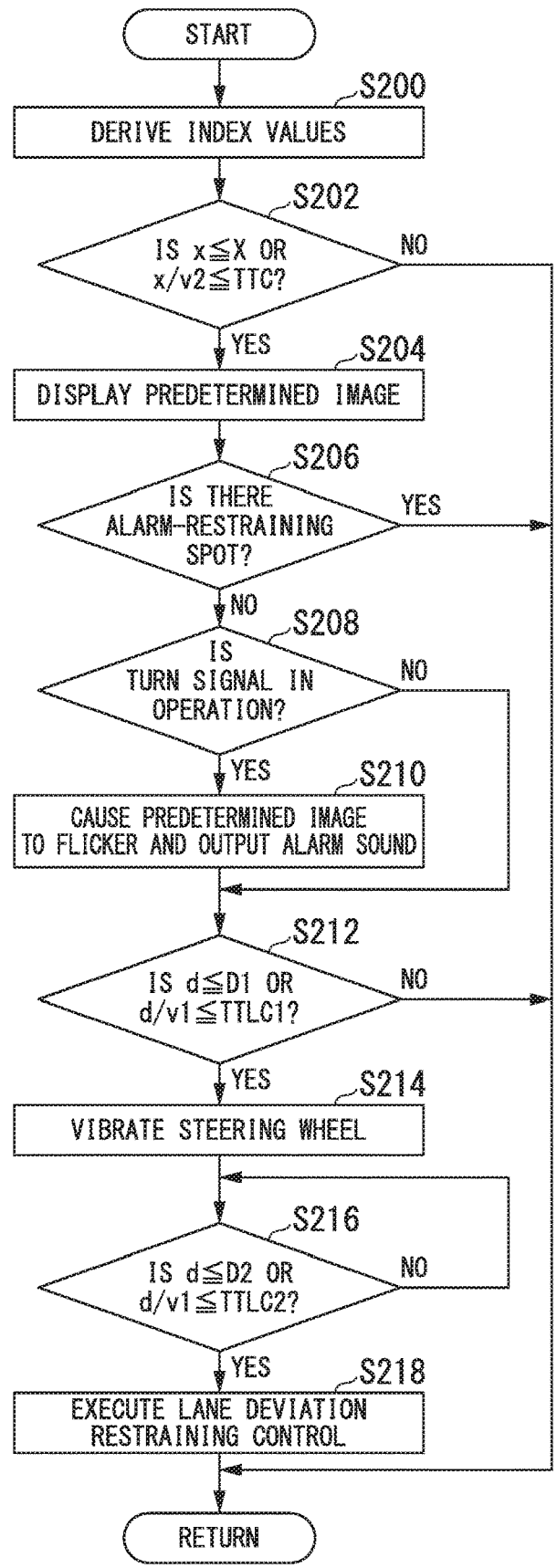
FIG. 20 is a flowchart illustrating a flow of a sequence of processing performed by the instrument operation control unit.

FIG. 20 is a flowchart illustrating a flow of a sequence of processing performed by the instrument operation control unit 310. Processing of this flowchart may be repetitively performed in a predetermined cycle.

First, the index value-deriving unit 314 derives various index values (Step S200). Next, the sounding-alarm determination unit 318 determines whether or not a first condition including that the relative distance x between the target vehicle $V_{tg}$ and the subject vehicle M derived by the index value-deriving unit 314 is equal to or smaller than the distance threshold value X, or the time-to-collision TTC (=x/v2) between the target vehicle $V_{tg}$ and the subject vehicle M is equal to or smaller than the time-to-collision threshold value TTC1 is satisfied (Step S202).

When it is determined that the relative distance x exceeds the distance threshold value X, or the time-to-collision TTC exceeds the time-to-collision threshold value TTC1, that is, when it is determined that the first condition is not satisfied, the sounding-alarm determination unit 318 determines that an alarm does not need to be output and ends the processing of this flowchart.

On the other hand, when it is determined that the relative distance x is equal to or smaller than the distance threshold value X, or the time-to-collision TTC is equal to or smaller than the time-to-collision threshold value TTC1, that is, when it is determined that the first condition is satisfied, the sounding-alarm determination unit 318 determines that an alarm needs to be output. In this case, the alarm output control unit 320 operates the BSI indicator 250 to cause the mirror surface of the door mirror DMR to display the predetermined image 250a (Step S204).

Next, the sounding-alarm determination unit 318 determines whether or not an alarm-restraining spot is present within a predetermined distance ahead in the subject vehicle lane, based on the alarm-restraining spot information DT3 acquired by the in-car communication device 240 (Step S206). For example, when an alarm-restraining spot indicated by the alarm-restraining spot information DT3 is mapped within a section to a predetermined distance in the subject vehicle lane, the sounding-alarm determination unit 318 determines that an alarm-restraining spot is present within a predetermined distance ahead in the subject vehicle lane. When an alarm-restraining spot indicated by the alarm-restraining spot information DT3 is not mapped within a section to a predetermined distance in the subject vehicle lane, the sounding-alarm determination unit 318 determines that an alarm-restraining spot is not present within a predetermined distance ahead in the subject vehicle lane. When it is determined that an alarm-restraining spot is present within a predetermined distance ahead in the subject vehicle lane, the sounding-alarm determination unit 318 determines that an alarm does not need to be output and ends the processing of this flowchart.

On the other hand, when it is determined that an alarm-restraining spot is no present within a predetermined distance ahead in the subject vehicle lane, the sounding-alarm determination unit 318 determines whether or not the turn signal on an adjacent lane side, on which the target vehicle $V_{tg}$ is present, is in operation, based on the detection result acquired by the lever position detection unit 262a (Step S208).

When it is determined that the turn signal on the adjacent lane side, on which the target vehicle $V_{tg}$ is present, is in operation, the alarm output control unit 320 controls the BSI indicator 250 to cause the predetermined image 250a displayed on the mirror surface of the door mirror DMR to flicker and causes the speaker 224 to output an alarm sound a predetermined number of times (for example, three times) or for a predetermined time (Step S210).

For example, when the target vehicle $V_{tg}$ is present behind in the adjacent lane on the left, the alarm output control unit 320 causes the speaker 224Lb, which is installed on the left rear end side in the vehicle cabin, to output an alarm sound. When the target vehicle $V_{tg}$ is present ahead in the adjacent lane on the left, a speaker 224La installed on the left front end side in the vehicle cabin is caused to output an alarm sound. When the target vehicle $V_{tg}$ is present behind in the adjacent lane on the right, a speaker 224Rb installed on the right rear end side in the vehicle cabin is caused to output an alarm sound. When the target vehicle $V_{tg}$ is present ahead in the adjacent lane on the right, a speaker 224Ra installed on the right front end side in the vehicle cabin is caused to output an alarm sound. Accordingly, an occupant can physically recognize the direction in which a vehicle that needs attention is present.

On the other hand, when it is determined that the turn signal on an adjacent lane side, on which the target vehicle $V_{tg}$ is present, is not in operation, the alarm output control unit 320 omits the processing of Step S210 and proceeds to the processing of Step S212 described below.

Next, the contact avoidance control unit 322 determines whether or not a second condition including that the distance d derived by the index value-deriving unit 314 is equal to or smaller than the first distance threshold value D1, or the lane deviation estimated time TTLC (=d/v1) obtained by dividing the distance d by the lateral velocity v1 of the subject vehicle M is equal to or smaller than the first time threshold value TTLC1 is satisfied (Step S110). When it is determined that the distance d exceeds the first distance threshold value D1, or the lane deviation estimated time TTLC (=d/v1) exceeds the first time threshold value TTLC1, that is, when it is determined that the second condition is not satisfied, the contact avoidance control unit 322 ends the processing of this flowchart.

On the other hand, when it is determined that the distance d is equal to or smaller than the first distance threshold value D1, or the lane deviation estimated time TTLC (=d/v1) is equal to or smaller than the first time threshold value TTLC1, that is, when it is determined that the second condition is satisfied, the contact avoidance control unit 322 operates the vibrator 264a to vibrate the steering wheel 264 (Step S214). At this time, if the mirror surface of the door mirror DMR is not displaying the predetermined image 250a yet, the alarm output control unit 320 may operate the BSI indicator 250 to cause the mirror surface of the door mirror DMR to display the predetermined image 250a. Moreover, the image may be caused to flicker.

Next, the contact avoidance control unit 322 stands by until the distance d becomes equal to or smaller than the second distance threshold value D2, or until the lane deviation estimated time TTLC (=d/v1) becomes equal to or smaller than the second time threshold value TTLC2 (Step S216). Lane deviation restraining control is executed when the distance d becomes equal to or smaller than the second distance threshold value D2, or the lane deviation estimated time TTLC (=d/v1) becomes equal to or smaller than the second time threshold value TTLC2 (Step S218). For example, as lane deviation restraining control, a lane deviation restraining control unit 116 outputs a reaction force to the steering wheel 264. At this time, the alarm output control unit 320 may cause the display 222 of the HMI 220 to display an image or may cause the speaker 224 to output an alarm sound. In this manner, the processing of this flowchart ends.

According to the embodiment described above, the server apparatus 100 generates a traveling trajectory of a probe vehicle based on positional information of the probe vehicle, and determines whether or not an alarm-restraining spot (an example of a predetermined spot) is present in a lane in which the probe vehicle has traveled based on the generated traveling trajectory. When it is determined that an alarm-restraining spot is present, the alarm-restraining spot information DT3 is transmitted to a vehicle in which the vehicle control system 200 is mounted. When the alarm-restraining spot information DT3 is received, the driving support apparatus 300 determines whether or not an alarm-restraining spot is present ahead in the subject vehicle lane in which the subject vehicle M is present, based on this information. When it is determined that no alarm-restraining spot is present, as a predetermined operation, the driving support apparatus 300 operates the BSI indicator 250, causes the speaker 224 to output an alarm sound, causes the display 222 to display an image, vibrates the steering wheel 264, or outputs a reaction force to the steering wheel 264, based on the relative distance x between a nearby vehicle present in an adjacent lane adjacent to the subject vehicle lane, and the subject vehicle M. On the other hand, the driving support apparatus 300 restrains various operations described above when it is determined that an alarm-restraining spot is present, when the subject vehicle M is traveling in an adjacent lane adjacent to a lane in which an alarm-restraining spot is present, or when the subject vehicle M performs a lane change from an adjacent lane to a lane in which an alarm-restraining spot is present. As a result, when an object is present within a lane, the HMI 220 and the in-car instrument can be controlled in a suitable mode.

Modification Example of Embodiment

Hereinafter, a modification example of the embodiment described above will be described. In the modification example of the embodiment, a probe vehicle transmits an image captured by an in-car camera to the server apparatus 100, in addition to its positional information. In this case, the server-side control unit 120 of the server apparatus 100 performs image processing with respect to the image captured by the in-car camera. When predetermined objects such as a sign board installed at a roadwork site, and a pole are detected, information of these detected objects is associated with the traveling trajectory information DT2 and is stored in the server-side storage 130. The alarm-restraining spot determination unit 126 of the server apparatus 100 may determine that an alarm-restraining spot is present on condition that the traveling trajectory information DT2 further includes information of predetermined objects, in addition to a pattern of the traveling trajectory information DT2 of the probe vehicle indicated by the traveling trajectory T, and the like. As a result, an alarm-restraining spot can be recognized more accurately.

In the embodiment described above, it has been described that processing of determining the presence or absence of an alarm-restraining spot is performed on the server apparatus 100 side. However, the embodiment is not limited thereto. The determining processing may be performed on the driving support apparatus 300 side. In this case, the server apparatus 100 transmits the traveling trajectory information DT2 to a vehicle in which the vehicle control system 200 is mounted. When the traveling trajectory information DT2 is received by the in-car communication device 240, the driving support apparatus 300 determines whether or not an alarm-restraining spot is present within a predetermined distance ahead in the subject vehicle lane, based on the traveling trajectory T of the probe vehicle indicated by this traveling trajectory information DT2.

For example, the sounding-alarm determination unit 318 of the driving support apparatus 300 determines whether or not an alarm-restraining spot is present within a predetermined distance ahead in the subject vehicle lane, based on the pattern of the traveling trajectory T indicated by the traveling trajectory information DT2, the interval between the node points N of the traveling trajectory T, and the traffic information. When it is determined that an alarm-restraining spot is present within a predetermined distance ahead in the subject vehicle lane, it is determined that an alarm does not need to be output. If not, it is determined that an alarm needs to be output. Through such processing, similar to the embodiment described above, when an object is present within a lane, the HMI 220 and the in-car instrument can be controlled in a suitable mode.

<Configuration of Hardware>

Figure 21:
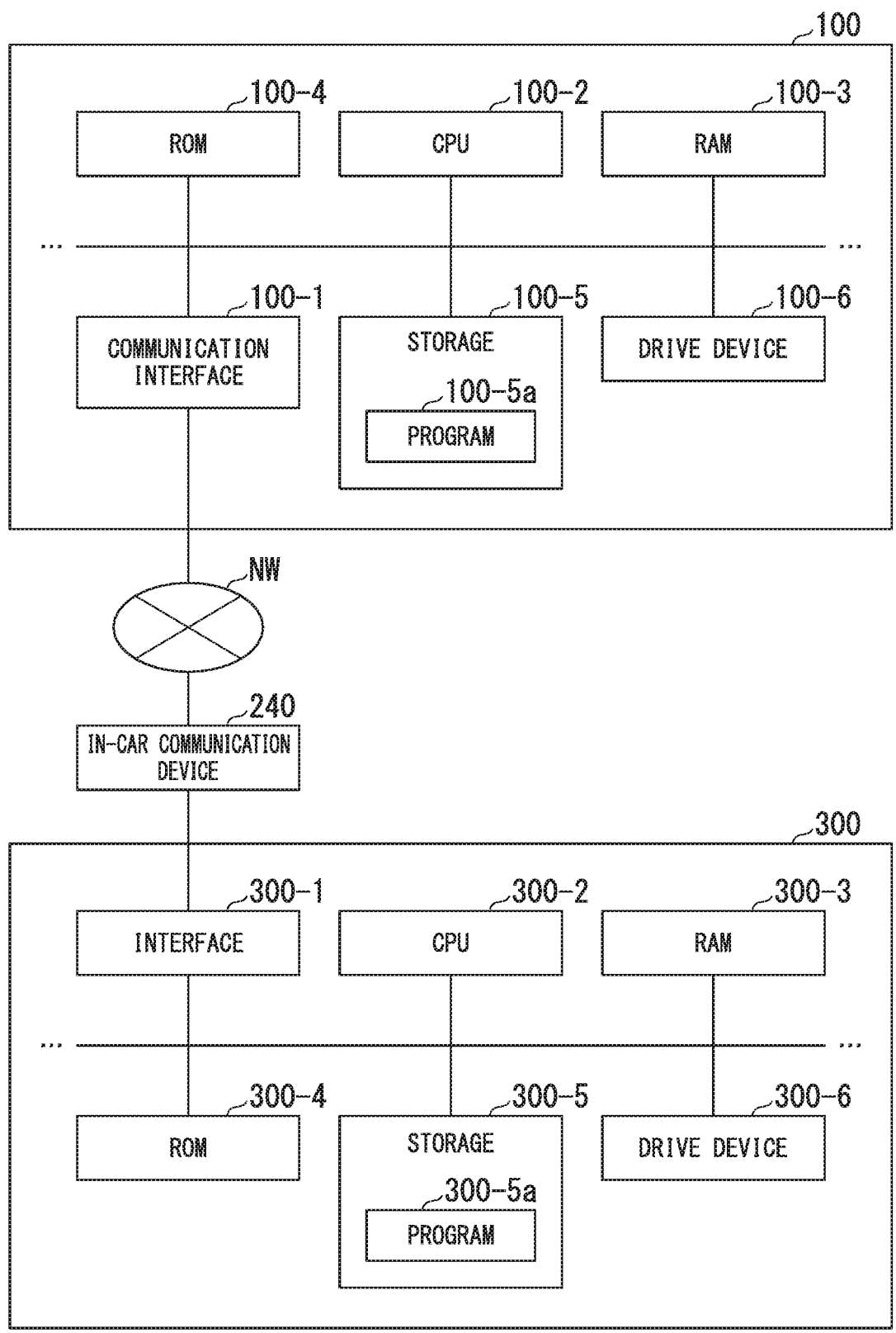
FIG. 21 is a view illustrating an example of a hardware configuration of the server apparatus and a driving support apparatus of the embodiment.

For example, the server apparatus 100 and the driving support apparatus 300 of the embodiment described above are realized by a hardware configuration as illustrated in FIG. 21. FIG. 21 is a view illustrating an example of a hardware configuration of the server apparatus 100 and the driving support apparatus 300 of the embodiment.

The server apparatus 100 has a configuration in which a communication interface 100-1 such as a network interface card (NIC), a CPU 100-2, a RAM 100-3, a ROM 100-4, a storage 100-5 such as a flash memory or an HDD, and a drive device 100-6 are connected to one another through an internal bus or a dedicated communication line. A portable storage medium such as an optical disk is mounted in the drive device 100-6. A program 100-5a stored in the storage 100-5 or a program stored in the portable storage medium mounted in the drive device 100-6 is driven in the RAM 100-3 by a direct memory access (DMA) controller (not illustrated) or the like, or is executed by the CPU 100-2, so that each of the functions of the server apparatus 100 is realized. For example, a program to which the CPU 100-2 is referred may be downloaded from another apparatus via the network NW such as the internet.

The driving support apparatus 300 has a configuration in which an interface 300-1 connected to the in-car communication device 240, a CPU 300-2, a RAM 300-3, a ROM 300-4, a storage 300-5 such as a flash memory or an HDD, and a drive device 300-6 are connected to one another through an internal bus or a dedicated communication line. A portable storage medium such as an optical disk is mounted in the drive device 300-6. A program 300-5*a* stored in the storage 300-5 or a program stored in the portable storage medium mounted in the drive device 300-6 is driven in the RAM 300-3 by a DMA controller (not illustrated) or the like, or is executed by the CPU 300-2, so that each of the functions of the driving support apparatus 300 is realized.

For example, a program to which the CPU 300-2 is referred may be downloaded from another apparatus via the network NW such as the internet.

The above embodiment can be expressed as follows.

A driving support system includes a server apparatus that is configured to have a first communication unit which communicates with one or more vehicles, a first storage unit which stores a first program, and a first processor. The first processor executes the first program to cause the first communication unit to acquire positional information from a specific vehicle of the one or more vehicles, to generate a traveling trajectory of the specific vehicle based on the positional information acquired by the first communication unit, to determine whether or not a predetermined spot is present in a lane in which the specific vehicle has traveled based on the generated traveling trajectory of the specific vehicle, and to cause the first communication unit to transmit information related to the predetermined spot to the one or more vehicles when it is determined that the predetermined spot is present in the lane in which the specific vehicle has traveled. The driving support system includes a driving support apparatus that is configured to have a second communication unit which communicates with the server apparatus, a second storage unit which stores a second program, and a second processor. The second processor executes the second program to cause the second communication unit to receive the information related to the predetermined spot from the server apparatus, to recognize an object present near a subject vehicle, to determine whether or not the predetermined spot is present ahead of the subject vehicle in a subject vehicle lane in which the subject vehicle is present based on the information received by the second communication unit, to cause an in-car instrument to perform a predetermined operation based on a relative distance between an object, of the recognized object, present in an adjacent lane adjacent to the subject vehicle lane and the subject vehicle when it is determined that the predetermined spot is not present ahead of the subject vehicle, and to restrain the in-car instrument from performing the predetermined operation when it is determined that the predetermined spot is present ahead of the subject vehicle.

Hereinabove, best modes for carrying out the present invention have been described with reference to the embodiment. The present invention is not limited to the above embodiment, and various changes and modifications can be applied within a range not departing from the gist of the present invention.

What is claimed is:

1. A driving support system, comprising:
   a server apparatus that includes
     a server-side communication unit which communicates with one or more vehicles and acquires positional information from a specific vehicle of the one or more vehicles,
     a generation unit which generates a traveling trajectory of the specific vehicle based on the positional information acquired by the server-side communication unit,
     a determination unit which determines whether or not a predetermined spot is present in one or more lanes in which the specific vehicle has traveled, based on the traveling trajectory of the specific vehicle generated by the generation unit, and
     a communication control unit which causes the server-side communication unit to transmit information related to the predetermined spot to the one or more vehicles when the determination unit determines that the predetermined spot is present; and
   a driving support apparatus that includes
     a vehicle side communication unit which receives the information related to the predetermined spot from the server apparatus,
     a recognition unit which recognizes one or more objects present near a subject vehicle, and
     an instrument operation control unit which determines whether or not the predetermined spot is present ahead of the subject vehicle in a subject vehicle lane in which the subject vehicle is present based on the information received by the vehicle side communication unit, causes an in-car instrument to perform a predetermined operation based on a relative distance between an object, of the one or more objects recognized by the recognition unit, present in an adjacent lane adjacent to the subject vehicle lane and the subject vehicle when it is determined that the predetermined spot is not present ahead of the subject vehicle, and restrains the in-car instrument from performing the predetermined operation when it is determined that the predetermined spot is present ahead of the subject vehicle,
   wherein the in-car instrument includes an output unit which outputs information, and a steering control unit which controls a steering wheel, and
   wherein the instrument operation control unit
     causes the output unit to output predetermined information as the predetermined operation when a first condition including that the relative distance is equal to or smaller than a threshold value or a time obtained by dividing the relative distance by a relative speed between an object present in an adjacent lane adjacent to the subject vehicle lane and the subject vehicle is equal to or smaller than a threshold value is satisfied, and
     causes the steering control unit to control the steering wheel as the predetermined operation when a second condition including that a distance between a demarcation line demarcating the subject vehicle lane and the subject vehicle is equal to or smaller than a threshold value or a time obtained by dividing the distance between the demarcation line demarcating the subject vehicle lane and the subject vehicle by a speed of the subject vehicle in a vehicle width direction is equal to or smaller than a threshold value is satisfied.

2. The driving support system according to claim 1, wherein the determination unit determines that the predetermined spot is present in the one or more lanes in which the specific vehicle has traveled, when the one or more lanes in which the specific vehicle has traveled include a first lane having a section in which the traveling trajectory is not present.

3. The driving support system according to claim 2, wherein the determination unit further determines that the predetermined spot is present in the one or more lanes in which the specific vehicle has traveled, when a plurality of traveling trajectories are present in a second lane adjacent to the first lane having the section in which the traveling trajectory is not present, in the one or more lanes in which the specific vehicle has traveled.

4. The driving support system according to claim 2, wherein the determination unit further determines that the predetermined spot is present in the one or more lanes in which the specific vehicle has traveled when the specific vehicle is decelerating at a time of acquiring the positional information.

5. The driving support system according to claim 1, wherein the server-side communication unit further communicates with another external device and acquires traffic information indicating a traffic situation of a road from the external device, and
wherein the determination unit determines whether or not the predetermined spot is present in the one or more lanes in which the specific vehicle has traveled, based on the traveling trajectory of the specific vehicle generated by the generation unit and the traffic information acquired by the server-side communication unit.

6. A driving support system, comprising:
a server apparatus that includes
   a server-side communication unit which communicates with one or more vehicles and acquires positional information from a specific vehicle of the one or more vehicles,
   a generation unit which generates a traveling trajectory of the specific vehicle based on the positional information acquired by the server-side communication unit, and
   a communication control unit which causes information related to the traveling trajectory generated by the generation unit to be transmitted to the one or more vehicles; and
a driving support apparatus that includes
   a vehicle side communication unit which receives the information related to the traveling trajectory from the server apparatus,
   a recognition unit which recognizes an object present near a subject vehicle, and
   an instrument operation control unit which determines whether or not a predetermined spot is present in one or more lanes in which the specific vehicle has traveled based on the information received by the vehicle side communication unit, causes an in-car instrument to perform a predetermined operation based on a relative distance between an object, of the one or more objects recognized by the recognition unit, present in an adjacent lane adjacent to a subject vehicle lane and the subject vehicle when a lane in which it is determined that the predetermined spot is present is not the subject vehicle lane in which the subject vehicle is present, and restrains the in-car instrument from performing the predetermined operation when the lane in which it is determined that the predetermined spot is present is the subject vehicle lane;
wherein the in-car instrument includes an output unit which outputs information, and a steering control unit which controls a steering wheel, and
wherein the instrument operation control unit
   causes the output unit to output predetermined information as the predetermined operation when a first condition including that the relative distance is equal to or smaller than a threshold value or a time obtained by dividing the relative distance by a relative speed between an object present in an adjacent lane adjacent to the subject vehicle lane and the subject vehicle is equal to or smaller than a threshold value is satisfied, and
   causes the steering control unit to control the steering wheel as the predetermined operation when a second condition including that a distance between a demarcation line demarcating the subject vehicle lane and the subject vehicle is equal to or smaller than a threshold value or a time obtained by dividing the distance between the demarcation line demarcating the subject vehicle lane and the subject vehicle by a speed of the subject vehicle in a vehicle width direction is equal to or smaller than a threshold value is satisfied.

7. A driving support apparatus, comprising:
a vehicle side communication unit which receives information related to a predetermined spot specified in a lane in which another vehicle has traveled, based on a traveling trajectory of the different vehicle;
a recognition unit which recognizes an object present near a subject vehicle; and
an instrument operation control unit which determines whether or not the predetermined spot is present ahead of the subject vehicle in a subject vehicle lane in which the subject vehicle is present based on the information received by the vehicle side communication unit, causes an in-car instrument to perform a predetermined operation based on a relative distance between an object, of one or more objects recognized by the recognition unit, present in an adjacent lane adjacent to the subject vehicle lane and the subject vehicle when it is determined that the predetermined spot is not present ahead of the subject vehicle, and restrains the in-car instrument from performing the predetermined operation when it is determined that the predetermined spot is present ahead of the subject vehicle,
wherein the in-car instrument includes an output unit which outputs information, and a steering control unit which controls a steering wheel, and
wherein the instrument operation control unit
   causes the output unit to output predetermined information as the predetermined operation when a first condition including that the relative distance is equal to or smaller than a threshold value or a time obtained by dividing the relative distance by a relative speed between an object present in an adjacent lane adjacent to the subject vehicle lane and the subject vehicle is equal to or smaller than a threshold value is satisfied, and
   causes the steering control unit to control the steering wheel as the predetermined operation when a second condition including that a distance between a demarcation line demarcating the subject vehicle lane and the subject vehicle is equal to or smaller than a threshold value or a time obtained by dividing the distance between the demarcation line demarcating the subject vehicle lane and the subject vehicle by a speed of the subject vehicle in a vehicle width direction is equal to or smaller than a threshold value is satisfied.

8. A driving support method, comprising:
causing a first computer
   to communicate with one or more vehicles and acquire positional information from a specific vehicle of the one or more vehicles, to generate a traveling trajectory of the specific vehicle based on the acquired positional information, to determine whether or not a predetermined spot is present in a lane in which the specific vehicle has traveled, based on the generated traveling trajectory of the specific vehicle, and to transmit information related to the predetermined spot to the one or more vehicles when it is determined that the predetermined spot is present in one or more lanes in which the specific vehicle has traveled; and causing a second computer mounted in the one or more vehicles to receive the information related to the predetermined spot from the first computer, to recognize an object present near a subject vehicle, to determine whether or not the predetermined spot is present ahead of the subject vehicle in a subject vehicle lane in which the subject vehicle is present, based on the received information, to cause an in-car instrument to perform a predetermined operation based on a relative distance between an object, of one or more of the recognized objects, present in an adjacent lane adjacent to the subject vehicle lane and the subject vehicle when it is determined that the predetermined spot is not present ahead of the subject vehicle, and to restrain the in-car instrument from performing the predetermined operation when it is determined that the predetermined spot is present ahead of the subject vehicle, wherein the in-car instrument includes an output unit which outputs information, and a steering control unit which controls a steering wheel, and wherein the instrument operation control unit causes the output unit to output predetermined information as the predetermined operation when a first condition including that the relative distance is equal to or smaller than a threshold value or a time obtained by dividing the relative distance by a relative speed between an object present in an adjacent lane adjacent to the subject vehicle lane and the subject vehicle is equal to or smaller than a threshold value is satisfied, and causes the steering control unit to control the steering wheel as the predetermined operation when a second condition including that a distance between a demarcation line demarcating the subject vehicle lane and the subject vehicle is equal to or smaller than a threshold value or a time obtained by dividing the distance between the demarcation line demarcating the subject vehicle lane and the subject vehicle by a speed of the subject vehicle in a vehicle width direction is equal to or smaller than a threshold value is satisfied.

* * * * *